United States Patent
Kurashige et al.

(10) Patent No.: US 12,379,322 B2
(45) Date of Patent: Aug. 5, 2025

(54) SPARKLE CONTRAST CORRECTING METHOD, COMPARING METHOD, COMPARING APPARATUS, ELECTRONIC DISPLAY MANUFACTURING METHOD, AND ANTI-GLARE LAYER MANUFACTURING METHOD

(71) Applicant: DAI NIPPON PRINTING CO., LTD., Tokyo (JP)

(72) Inventors: Makio Kurashige, Tokyo (JP); Gen Furui, Tokyo (JP); Kazutoshi Ishida, Tokyo (JP); Hiroko Suzuki, Tokyo (JP); Masayuki Tsunekawa, Tokyo (JP); Yukimitsu Iwata, Tokyo (JP); Norinaga Nakamura, Tokyo (JP); Shumpei Nishio, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 310 days.

(21) Appl. No.: 18/247,570

(22) PCT Filed: Nov. 24, 2020

(86) PCT No.: PCT/JP2020/043685
§ 371 (c)(1),
(2) Date: Mar. 31, 2023

(87) PCT Pub. No.: WO2022/070437
PCT Pub. Date: Apr. 7, 2022

(65) Prior Publication Data
US 2024/0027357 A1     Jan. 25, 2024

(30) Foreign Application Priority Data

Oct. 2, 2020  (JP) ................................. 2020-168022
Oct. 28, 2020 (JP) ................................. 2020-180850

(51) Int. Cl.
*G01N 21/84* (2006.01)
*G01N 21/95* (2006.01)

(52) U.S. Cl.
CPC .. *G01N 21/8422* (2013.01); *G01N 2021/8427* (2013.01); *G01N 2021/9513* (2013.01)

(58) Field of Classification Search
CPC ....... G01N 21/8422; G01N 2021/8427; G01N 2021/9513
See application file for complete search history.

(56) References Cited

U.S. PATENT DOCUMENTS

2010/0189956 A1*  7/2010  Etori ...................... G03B 21/62
                                                                 428/141

FOREIGN PATENT DOCUMENTS

| CN | 1914523 | 2/2007 |
|---|---|---|
| CN | 101360990 | 2/2009 |

(Continued)

OTHER PUBLICATIONS

Chinese Office Action, issued in the corresponding Chinese patent application 202080105795.6, dated May 21, 2024, 37 pages (with the machine translation).

(Continued)

*Primary Examiner* — Georgia Y Epps
*Assistant Examiner* — Don J Williams
(74) *Attorney, Agent, or Firm* — HSML P.C.

(57) ABSTRACT

A sparkle contrast correcting method includes a step of acquiring a first sparkle contrast that is caused by an anti-glare layer that is disposed on a surface of an electronic display and information that represents a first measurement condition, the first sparkle contrast being used as a comparison standard and being measured in the first measurement condition by using a first imaging lens that images emitted light from the anti-glare layer and a first two- (Continued)

dimensional image sensor on which the emitted light is imaged, a step of acquiring a second sparkle contrast that is caused by the anti-glare layer and information that represents a second measurement condition, the second sparkle contrast being used as a comparison target and being measured in the second measurement condition that differs from the first measurement condition by using a second imaging lens that images emitted light from the anti-glare layer and a second two-dimensional image sensor on which the emitted light is imaged, and a step of correcting the second sparkle contrast, based on a ratio between the first measurement condition and the second measurement condition for comparison with the first sparkle contrast.

34 Claims, 12 Drawing Sheets

(56) References Cited

FOREIGN PATENT DOCUMENTS

| | | |
|---|---|---|
| CN | 103929130 | 7/2014 |
| CN | 108088658 | 5/2018 |
| CN | 110399633 | 11/2019 |
| JP | 2000-304648 | 11/2000 |
| JP | 2004-239663 | 8/2004 |
| JP | 2009-074981 | 4/2009 |
| JP | 2009-175041 | 8/2009 |
| JP | 2010-169788 | 8/2010 |
| JP | 2020-025224 | 2/2020 |
| TW | 201250370 | 12/2012 |
| WO | 2018/021388 | 2/2018 |
| WO | 2020/085308 | 4/2020 |

OTHER PUBLICATIONS

International Preliminary Report on Patentability, issued in the corresponding PCT Application No. PCT/JP2020/043685, dated Apr. 13, 2023, 6 pages (with machine translation).
Japanese Office Action, issued in the corresponding Japanese Patent application No. 2022-519612, dated Jun. 17, 2022, 7 pages (with machine translation).
Japanese Office Action, issued in the corresponding Japanese Patent Application No. 2022-519612, dated Sep. 9, 2022, 8 pages (with machine translation).
International Search Report, issued in the corresponding PCT Application No. PCT/JP2020/043685, dated Feb. 9, 2021, 7 pages (with machine translation).
"DNP Clarifies Optical Principle for Measurement of Display Sparkle Contrast", Dai Nippon Printing Co., Ltd., Mar. 5, 2020, 6 pages (with translation) available at https://www.global.dnp/news/detail/20167125_4126.html#:~:text=(DNP)%20has%20clarified%20an%20optical,comparison%20of%20the%20measured%20values.
Taiwan Office Action, issued in the corresponding Taiwanese application No. 109141280, dated May 4, 2023, 11 pages.

* cited by examiner

SPARKLE CONTRAST CORRECTING METHOD, COMPARING METHOD, COMPARING APPARATUS, ELECTRONIC DISPLAY MANUFACTURING METHOD, AND ANTI-GLARE LAYER MANUFACTURING METHOD

TECHNICAL FIELD

The present disclosure relates to a sparkle contrast correcting method, a comparing method, a comparing apparatus, an electronic display manufacturing method, and an anti-glare layer manufacturing method.

BACKGROUND ART

JP2009-175041A discloses a technique for quantitatively measuring and evaluating a luminance variation of an image that is displayed on an electronic display that includes an antiglare film due to sparkle. In a sparkle measuring method disclosed in JP2009-175041A, a periodic component derived from the electronic display other than the sparkle is removed from a sparkle image that is imaged by a camera by applying two-dimensional Fourier transform. In the sparkle measuring method disclosed in JP2009-175041A, a value acquired by dividing the standard deviation of the luminance variation of the sparkle image from which the periodic component is removed by an average value is evaluated as a sparkle contrast.

As for a sparkle measuring apparatus disclosed in JP2009-175041A, however, the influence of an imaging condition on the sparkle contrast is not considered. As for the sparkle measuring apparatus disclosed in JP2009-175041A, appropriate comparison between multiple sparkle contrasts that are measured in different measurement conditions is not effectively proposed.

SUMMARY OF INVENTION

The present disclosure has been accomplished in view of the matters described above. That is, it is an object of the present disclosure to provide a sparkle contrast correcting method, a comparing method, a comparing apparatus, an electronic display manufacturing method, and an anti-glare layer manufacturing method that enable multiple sparkle contrasts in different measurement conditions to be appropriately compared.

A sparkle contrast correcting method according to the present disclosure includes a step of acquiring a first sparkle contrast that is caused by an anti-glare layer that is disposed on a surface of an electronic display and information that represents a first measurement condition, the first sparkle contrast being used as a comparison standard and being measured in the first measurement condition by using a first imaging lens that images emitted light from the anti-glare layer and a first two-dimensional image sensor on which the emitted light is imaged, a step of acquiring a second sparkle contrast that is caused by the anti-glare layer and information that represents a second measurement condition, the second sparkle contrast being used as a comparison target and being measured in the second measurement condition that differs from the first measurement condition by using a second imaging lens that images emitted light from the anti-glare layer and a second two-dimensional image sensor on which the emitted light is imaged, and a step of correcting the second sparkle contrast, based on a ratio between the first measurement condition and the second measurement condition for comparison with the first sparkle contrast.

As for the sparkle contrast correcting method according to the present disclosure, the step of correcting the second sparkle contrast may be performed in accordance with a numerical formula (1) expressed as:

$$S_P 2a = S_P 2 \times (F2/F1) \times (d2/d1) \times (f1/f2) \times (M2/M1)^{0.5}, \quad (1)$$

where $S_P 2a$ is the second sparkle contrast that is corrected,
$S_P 2$ is the second sparkle contrast that is not corrected,
F1 is an image effective F-number of the first imaging lens, included in the first measurement condition,
F2 is an image effective F-number of the second imaging lens, included in the second measurement condition,
d1 is a distance from the anti-glare layer to the first imaging lens, included in the first measurement condition,
d2 is a distance from the anti-glare layer to the second imaging lens, included in the second measurement condition,
f1 is an effective focal length of the first imaging lens, included in the first measurement condition,
f2 is an effective focal length of the second imaging lens, included in the second measurement condition,
M1 is a value that is calculated by using a numerical formula (2), and
M2 is a value that is calculated by using a numerical formula (3), the numerical formula (2) being expressed as:

[Math. 1]

$$M1 = \left[ \sqrt{\frac{Ac1}{Am1}} \, \mathrm{erf}\left(\sqrt{\frac{\pi \, Am1}{Ac1}}\right) - \left(\frac{Ac1}{\pi \, Am1}\right)\left\{1 - \exp\left(-\frac{\pi \, Am1}{Ac1}\right)\right\} \right]^{-2} \quad (2)$$

where Ac1 is a parameter expressed as $(((4/\pi) \times F1 \times \lambda)/2)^2 \times \pi$, where $\lambda$ is a wavelength of the emitted light, Am1 is a parameter expressed as $p1^2$, where p1 is a pixel pitch of the first two-dimensional image sensor, included in the first measurement condition, and erf is a standard error function, the numerical formula (3) being expressed as:

[Math. 2]

$$M2 = \left[ \sqrt{\frac{Ac2}{Am2}} \, \mathrm{erf}\left(\sqrt{\frac{\pi \, Am2}{Ac2}}\right) - \left(\frac{Ac2}{\pi \, Am2}\right)\left\{1 - \exp\left(-\frac{\pi \, Am2}{Ac2}\right)\right\} \right]^{-2} \quad (3)$$

where Ac2 is a parameter expressed as $(((4/\pi) \times F2 \times \lambda)/2)^2 \times \pi$, where $\lambda$ is the wavelength of the emitted light, and
Am2 is a parameter expressed as $p2^2$, where pp2 is a pixel pitch of the second two-dimensional image sensor, included in the second measurement condition.

As for the sparkle contrast correcting method according to the present disclosure, the step of correcting the second sparkle contrast may be performed in accordance with a numerical formula (4) expressed as:

$$S_P 2a = S_P 2 \times (F2/F1) \times (m1/m2) \times (M2/M1)^{0.5}, \quad (4)$$

where $S_P 2a$ is the second sparkle contrast that is corrected,
$S_P 2$ is the second sparkle contrast that is not corrected,
F1 is an image effective F-number of the first imaging lens, included in the first measurement condition, F2 is an image effective F-number of the second imaging lens, included in the second measurement condition,
m1 is an optical magnification of the first imaging lens, included in the first measurement condition,
m2 is an optical magnification of the second imaging lens, included in the second measurement condition,
M1 is a value that is calculated by using a numerical formula (2), and
M2 is a value that is calculated by using a numerical formula (3),
the numerical formula (2) being expressed as:

[Math. 3]

$$M1 = \left[\sqrt{\frac{Ac1}{Am1}}\, \mathrm{erf}\left(\sqrt{\frac{\pi\, Am1}{Ac1}}\right) - \left(\frac{Ac1}{\pi\, Am1}\right)\left\{1 - \exp\left(-\frac{\pi\, AM1}{Ac1}\right)\right\}\right]^{-2} \quad (2)$$

where Ac1 is a parameter expressed as $(((4/\pi)\times F1\times\lambda)/2)^2\times n$, where $\lambda$ is a wavelength of the emitted light,
Am1 is a parameter expressed as $p1^2$, where p1 is a pixel pitch of the first two-dimensional image sensor, included in the first measurement condition, and
erf is a standard error function, the numerical formula (3) being expressed as:

[Math. 4]

$$M2 = \left[\sqrt{\frac{Ac2}{Am2}}\, \mathrm{erf}\left(\sqrt{\frac{\pi\, Am2}{Ac2}}\right) - \left(\frac{Ac2}{\pi\, Am2}\right)\left\{1 - \exp\left(-\frac{\pi\, Am2}{Ac2}\right)\right\}\right]^{-2} \quad (3)$$

where Ac2 is a parameter expressed as $(((4/\pi)\times F2\times\lambda)/2)^2\times n$, where $\lambda$ is the wavelength of the emitted light, and
Am2 is a parameter expressed as $p2^2$, where p2 is a pixel pitch of the second two-dimensional image sensor, included in the second measurement condition.

As for the sparkle contrast correcting method according to the present disclosure, the step of correcting the second sparkle contrast may be performed in accordance with a numerical formula (5) expressed as:

$$S_p2a = S_p2\times(F2'/F1')\times(M2/M1)^{0.5}, \quad (5)$$

where $S_p2a$ is the second sparkle contrast that is corrected,
$S_p2$ is the second sparkle contrast that is not corrected,
F1' is an object effective F-number of the first imaging lens, included in the first measurement condition,
F2' is an object effective F-number of the second imaging lens, included in the second measurement condition,
M1 is a value that is calculated by using a numerical formula (2), and
M2 is a value that is calculated by using a numerical formula (3), the numerical formula (2) being expressed as:

[Math. 5]

$$M1 = \left[\sqrt{\frac{Ac1}{Am1}}\, \mathrm{erf}\left(\sqrt{\frac{\pi\, Am1}{Ac1}}\right) - \left(\frac{Ac1}{\pi\, Am1}\right)\left\{1 - \exp\left(-\frac{\pi\, Am1}{Ac1}\right)\right\}\right]^{-2} \quad (2)$$

Where Ac2 is a parameter expressed as $(((4/\pi)\times F1\times\lambda)/2)^2\times \pi$, where $\lambda$ is a wavelength of the emitted light,
Am1 is a parameter expressed as $p1^2$, where p1 is a pixel pitch of the first two-dimensional image sensor, included in the first measurement condition, and
erf is a standard error function, the numerical formula (3) being expressed as:

[Math. 6]

$$M2 = \left[\sqrt{\frac{Ac2}{Am2}}\, \mathrm{erf}\left(\sqrt{\frac{\pi\, Am2}{Ac2}}\right) - \left(\frac{Ac2}{\pi\, Am2}\right)\left\{1 - \exp\left(-\frac{\pi\, Am2}{Ac2}\right)\right\}\right]^{-2} \quad (3)$$

Where Ac2 is a parameter expressed as $(((4/\pi)\times F2\times\lambda)/2)^2\times n$, where $\lambda$ is the wavelength of the emitted light, and
Am2 is a parameter expressed as $p2^2$, where p2 is a pixel pitch of the second two-dimensional image sensor, included in the second measurement condition.

A sparkle contrast correcting method according to the present disclosure includes a step of acquiring a first sparkle contrast that is caused by an anti-glare layer that is disposed on a surface of an electronic display and information that represents a first measurement condition, the first sparkle contrast being used as a comparison standard and being measured in the first measurement condition by using a first imaging lens that images emitted light from the anti-glare layer and a first two-dimensional image sensor on which the emitted light is imaged, a step of acquiring a second sparkle contrast that is caused by the anti-glare layer and information that represents a second measurement condition, the second sparkle contrast being used as a comparison target and being measured in the second measurement condition that differs from the first measurement condition by using a second imaging lens that images emitted light from the anti-glare layer and a second two-dimensional image sensor on which the emitted light is imaged, and a step of correcting the second sparkle contrast for comparison with the first sparkle contrast. The step of correcting the second sparkle contrast includes a step of making a correction calculation on an image of the emitted light that is imaged in the second measurement condition such that a MTF that is calculated based on the image matches a MTF based on an image of the emitted light that is imaged in the first measurement condition in a case where the first measurement condition and the second measurement condition satisfy a numerical formula (6), and a step of acquiring the second sparkle contrast that is corrected from an image that is acquired by making the correction calculation, the numerical formula (6) being expressed as:

$$S1=S2, \quad (6)$$

where S1 is a size of a light-emitting region on the anti-glare layer contributory to imaging a diffraction limit spot of the emitted light on the first two-dimensional image sensor, included in the first measurement condition, and satisfies a numerical formula (7), and
S2 is a size of a light-emitting region on the anti-glare layer contributory to imaging a diffraction limit spot of the emitted light on the second two-dimensional image sensor, included in the second measurement condition, and satisfies a numerical formula (8), the numerical formula (7) being expressed as:

[Math. 7]

$$S1 = \frac{R1}{m1} \propto \frac{F1}{m1} = F1\frac{d1}{f1} = F1'  \quad (7)$$

where R1 is a size of the diffraction limit spot on the first two-dimensional image sensor, m1 is an optical magnification of the first imaging lens, included in the first measurement condition, F1 is an image effective F-number of the first imaging lens, included in the first measurement condition, d1 is a distance from the anti-glare layer to the first imaging lens, included in the first measurement condition, f1 is an effective focal length of the first imaging lens, included in the first measurement condition, and F1' is an object effective F-number of the first imaging lens, included in the first measurement condition, the numerical formula (8) being expressed as:

[Math. 8]

$$S2 = \frac{R2}{m2} \propto \frac{F2}{m2} = F2\frac{d2}{f2} = F2'  \quad (8)$$

R2 is a size of the diffraction limit spot on the second two-dimensional image sensor, m2 is an optical magnification of the second imaging lens, included in the second measurement condition, F2 is an image effective F-number of the second imaging lens, included in the second measurement condition, d2 is a distance from the anti-glare layer to the second imaging lens, included in the second measurement condition, f2 is an effective focal length of the second imaging lens, included in the second measurement condition, and F2' is an object effective F-number of the second imaging lens, included in the second measurement condition.

As for the sparkle contrast correcting method according to the present disclosure, the step of making the correction calculation may include a step of adjusting a coefficient of an enhancement filter that adjusts resolution of the image of the emitted light that is imaged in the second measurement condition.

As for the sparkle contrast correcting method according to the present disclosure, the step of making the correction calculation may further include a step of generating an edge profile of the image of the emitted light that is imaged in the second measurement condition, a step of calculating a line spread function by differentiating the generated edge profile, a step of calculating a MTF by applying Fourier transform to the calculated line spread function, and a step of comparing the calculated MTF with the MTF based on the image of the emitted light that is imaged in the first measurement condition.

As for the sparkle contrast correcting method according to the present disclosure, the step of correcting the second sparkle contrast may include a step of matching an average value of radiance of the image that is acquired by making the correction calculation to an average value of radiance of the image of the emitted light that is imaged in the first measurement condition between the step of making the correction calculation on the image of the emitted light that is imaged in the second measurement condition and the step of acquiring the second sparkle contrast that is corrected from the image that is acquired by making the correction calculation.

As for the sparkle contrast correcting method according to the present disclosure, the step of correcting the second sparkle contrast may include a step of removing an image component that is generated due to a pixel of the electronic display from the image that is acquired by making the correction calculation between the step of making the correction calculation on the image of the emitted light that is imaged in the second measurement condition and the step of matching the average value of radiance of the image that is acquired by making the correction calculation to the average value of radiance of the image of the emitted light that is imaged in the first measurement condition.

A sparkle contrast correcting method according to the present disclosure includes a step of acquiring a third sparkle contrast that is caused by an anti-glare layer that is disposed on a surface of an electronic display and information that represents an imaginary measurement condition, the third sparkle contrast being used as a comparison standard and being imaginarily measured in the imaginary measurement condition by using an imaginary imaging lens that images emitted light from the anti-glare layer and an imaginary two-dimensional image sensor on which the emitted light is imaged, a step of acquiring a fourth sparkle contrast that is caused by the anti-glare layer and information that represents an actual measurement condition, the fourth sparkle contrast being used as a comparison target and being actually measured in the actual measurement condition by using an actual imaging lens that images emitted light from the anti-glare layer and an actual two-dimensional image sensor on which the emitted light is imaged, and a step of correcting the fourth sparkle contrast for comparison with the third sparkle contrast. The step of correcting the fourth sparkle contrast includes a step of correcting the fourth sparkle contrast in accordance with a numerical formula (10) in a case where the imaginary measurement condition and the actual measurement condition satisfy a numerical formula (9) expressed as:

$S3 \neq S4$,  (9) the numerical formula (10) being expressed as:

$S_P 4a = S_P 4 \times (S4/S3)$,  (10)

where S3 is a size of a light-emitting region on the anti-glare layer contributory to imaging a diffraction limit spot of the emitted light from the anti-glare layer on the two-dimensional image sensor, included in the imaginary measurement condition, and satisfies a numerical formula (11), S4 is a size of a light-emitting region on the anti-glare layer contributory to imaging a diffraction limit spot of the emitted light from the anti-glare layer on the two-dimensional image sensor, included in the actual measurement condition, and satisfies a numerical formula (12), $S_P 4a$ is the fourth sparkle contrast that is corrected, and $S_P 4$ is the fourth sparkle contrast that is not corrected, the numerical formula (11) being expressed as:

[Math. 9]

$$S3 = \frac{R3}{m3} \propto \frac{F3}{m3} = F3\frac{d3}{f3} = F3'  \quad (9)$$

where R3 is a size of the diffraction limit spot on the two-dimensional image sensor, m3 is an optical magnification of the imaging lens, included in the imaginary measurement condition, F3 is an image effective F-number of the imaging lens, included in the imaginary measurement condition, d3 is a distance from the anti-glare layer to the imaging lens, included in the imaginary measurement condition, f3 is an effective focal length of the imaging lens, included in the imaginary measurement condition, and F3' is an object effective F-number of the imaging lens, included in the imaginary measurement condition, the numerical formula (12) being expressed as:

[Math. 10]

$$S4 = \frac{R4}{m4} \propto \frac{F4}{m4} = F1\frac{d4}{f4} = F4' \quad (10)$$

where R4 is a size of the diffraction limit spot on the two-dimensional image sensor, m4 is an optical magnification of the imaging lens, included in the actual measurement condition, F4 is an image effective F-number of the imaging lens, included in the actual measurement condition, d4 is a distance from the anti-glare layer to the imaging lens, included in the actual measurement condition, f4 is an effective focal length of the imaging lens, included in the actual measurement condition, and F4' is an object effective F-number of the imaging lens, included in the actual measurement condition.

As for the sparkle contrast correcting method according to the present disclosure, the step of correcting the fourth sparkle contrast may further includes a step of correcting the fourth sparkle contrast in accordance with a numerical formula (13) expressed as:

$$S_P 4a' = S_P 4a \times (M4/M3)^{0.5}, \quad (13)$$

where $S_P 4a'$ is the fourth sparkle contrast that is corrected in accordance with the numerical formula (13), M3 is a value that is calculated by using a numerical formula (14), and M4 is a value that is calculated by using a numerical formula (15), the numerical formula (14) being expressed as:

[Math. 11]

$$M3 = \left[\sqrt{\frac{Ac3}{Am3}} \operatorname{erf}\left(\sqrt{\frac{\pi \, Am3}{Ac3}}\right) - \left(\frac{Ac3}{\pi \, Am3}\right)\left\{1 - \exp\left(-\frac{\pi \, Am3}{Ac3}\right)\right\}\right]^{-2} \quad (14)$$

where Ac3 is a parameter expressed as $(((4/\pi) \times F3 \times \lambda)/2)^2 \times n$, where $\lambda$ is a wavelength of the emitted light, Am3 is a parameter expressed as $p3^2$, where p3 is a pixel pitch of the two-dimensional image sensor, included in the imaginary measurement condition, and erf is a standard error function, the numerical formula (15) being expressed as:

[Math. 12]

$$M4 = \left[\sqrt{\frac{Ac4}{Am4}} \operatorname{erf}\left(\sqrt{\frac{\pi \, Am4}{Ac4}}\right) - \left(\frac{Ac4}{\pi \, Am4}\right)\left\{1 - \exp\left(-\frac{\pi \, Am4}{Ac4}\right)\right\}\right]^{-2} \quad (15)$$

where Ac4 is a parameter expressed as $(((4/\pi) \times F4 \times \lambda)/2)^2 \times n$, where $\lambda$ is the wavelength of the emitted light, and Am4 is a parameter expressed as $p4^2$, where p4 is a pixel pitch of the two-dimensional image sensor, included in the imaginary measurement condition.

As for the sparkle contrast correcting method according to the present disclosure, between the first measurement condition and the second measurement condition or between the imaginary measurement condition and the actual measurement condition, structural conditions of the electronic display, the anti-glare layer, and measurement devices that include the imaging lenses and the two-dimensional image sensors may be the same, and measurement conditions including distances from the anti-glare layer to the imaging lenses with the measurement devices may differ.

As for the sparkle contrast correcting method according to the present disclosure, between the first measurement condition and the second measurement condition or between the imaginary measurement condition and the actual measurement condition, structural conditions of the electronic display and the anti-glare layer may be the same, structural conditions of measurement devices that include the imaging lenses and the two-dimensional image sensors may differ, and measurement conditions including distances from the anti-glare layer to the imaging lenses with the measurement devices may differ.

As for the sparkle contrast correcting method according to the present disclosure, between the first measurement condition and the second measurement condition or between the imaginary measurement condition and the actual measurement condition, structural conditions of the electronic display and measurement devices that include the imaging lenses and the two-dimensional image sensors may be the same, structural conditions of the anti-glare layer may differ, and measurement conditions including distances from the anti-glare layer to the imaging lenses with the measurement devices may differ.

A sparkle contrast comparing method according to the present disclosure includes a step of comparing the sparkle contrast that is used as the comparison target and that is corrected by using the sparkle contrast correcting method described above with the sparkle contrast that is used as the comparison standard.

The sparkle contrast comparing method according to the present disclosure may further include a step of outputting a result of comparison between the sparkle contrast that is used as the comparison target and that is corrected and the sparkle contrast that is used as the comparison standard.

An electronic display manufacturing method according to the present disclosure includes a step of inspecting whether an electronic display to be inspected meets an acceptance standard of sparkle contrast. The inspecting step includes the comparing step described above. The comparing step is a step of using a sparkle contrast of the electronic display to be inspected as the sparkle contrast that is used as the comparison target or the sparkle contrast that is used as the comparison standard, using a sparkle contrast meeting the acceptance standard as the other of the sparkle contrast that is used as the comparison target or the sparkle contrast that is used as the comparison standard, and comparing the sparkle contrast of the electronic display to be inspected with the sparkle contrast meeting the acceptance standard.

As for the electronic display manufacturing method according to the present disclosure, no anti-glare layer may be disposed on a surface of the electronic display to be inspected, and an anti-glare layer for inspection may be disposed on the surface to measure the sparkle contrast at the inspecting step. The anti-glare layer for inspection may have a predetermined characteristic.

As for the electronic display manufacturing method according to the present disclosure, an anti-glare layer may be disposed on a surface of the electronic display to be inspected.

An anti-glare layer manufacturing method according to the present disclosure includes a step of forming an anti-glare layer to be inspected, and a step of inspecting whether the anti-glare layer to be inspected meets an acceptance standard of sparkle contrast. The inspecting step includes the comparing step described above. The comparing step is a step of using a sparkle contrast of an electronic display with the anti-glare layer to be inspected being disposed on a surface as the sparkle contrast that is used as the comparison target or the sparkle contrast that is used as the comparison standard, using a sparkle contrast meeting the acceptance standard as the other of the sparkle contrast that is used as the comparison target or the sparkle contrast that is used as the comparison standard, and comparing the sparkle contrast meeting the acceptance standard with the sparkle contrast of the electronic display with the anti-glare layer to be inspected being disposed on the surface.

As for the anti-glare layer manufacturing method according to the present disclosure, the anti-glare layer to be inspected may be disposed on a surface of an electronic display for inspection to measure the sparkle contrast at the inspecting step. The electronic display for inspection may have a predetermined characteristic.

As for the anti-glare layer manufacturing method according to the present disclosure, the step of forming the anti-glare layer to be inspected may include a step of forming a layer that has an antiglare function on a base material.

The step of forming the layer that has the antiglare function on the base material may include a step of applying an anti-glare layer composition that contains resin to the base material, and a step of curing the applied anti-glare layer composition.

An anti-glare layer according to the present disclosure is an anti-glare layer that is manufactured by using the anti-glare layer manufacturing method described above.

A sparkle contrast comparing apparatus according to the present disclosure includes a corrector that corrects the sparkle contrast that is used as the comparison target by using the sparkle contrast correcting method described above, and a comparator that compares the sparkle contrast that is used as the comparison target and that is corrected and the sparkle contrast that is used as the comparison standard.

An anti-glare layer selecting method according to the present disclosure includes a step of selecting an anti-glare layer by using the sparkle contrast comparing method described above. The step of selecting the anti-glare layer includes a step of using a first measurement contrast acquired by measuring a sparkle contrast of an electronic display with a first anti-glare layer being disposed on a surface by using a first optical measurement device as the sparkle contrast that is used as the comparison standard, using a second measurement contrast acquired by measuring a sparkle contrast of the electronic display with a second anti-glare layer that differs from the first anti-glare layer being disposed on the surface by using a second optical measurement device that differs from the first optical measurement device as the sparkle contrast that is used as the comparison target, and comparing the first measurement contrast and the second measurement contrast by using the comparing method along with correction of one of the contrasts, and a step of selecting the first anti-glare layer or the second anti-glare layer, based on a result of the comparison.

As for the anti-glare layer selecting method according to the present disclosure, the step of selecting the first anti-glare layer or the second anti-glare layer may include a step of selecting an anti-glare layer having a good measurement contrast from the first anti-glare layer and the second anti-glare layer.

An anti-glare layer according to the present disclosure is an anti-glare layer that is selected by using the anti-glare layer selecting method described above.

A polarizer according to the present disclosure is a polarizer that includes the anti-glare layer that is selected by using the anti-glare layer selecting method described above.

A display element according to the present disclosure is a display element that includes the anti-glare layer that is selected by using the anti-glare layer selecting method described above.

An electronic display according to the present disclosure is an electronic display that includes the anti-glare layer that is selected by using the anti-glare layer selecting method described above.

A display element selecting method according to the present disclosure includes a step of selecting a display element that is an electronic display with no anti-glare layer is disposed on a surface by using the sparkle contrast comparing method described above. The step of selecting the display element includes a step of using a third measurement contrast that is measured with a third anti-glare layer being disposed on a surface of a first display element by using a third optical measurement device as the sparkle contrast that is used as the comparison standard, using a fourth measurement contrast that is measured with the third anti-glare layer being disposed on a surface of a second display element that differs from the first display element by using a fourth optical measurement device that differs from the third optical measurement device as the sparkle contrast that is used as the comparison target, and comparing the third measurement contrast and the fourth measurement contrast by using the comparing method along with correction of one of the contrasts, and a step of selecting the first display element or the second display element, based on a result of the comparison.

As for the display element selecting method according to the present disclosure, the step of selecting the first display element or the second display element may include a step of selecting a display element having a good measurement contrast from the first display element and the second display element.

An electronic display according to the present disclosure is an electronic display that includes the display element that is selected by using the display element selecting method described above.

A sparkle contrast correcting method according to the present disclosure includes a step of acquiring multiple sparkle contrasts that are caused by an anti-glare layer disposed on a surface of an electronic display and that are measured in multiple different measurement conditions and information that represents the multiple measurement conditions, and a step of correcting at least one of the multiple sparkle contrasts, based on the information that represents the multiple measurement conditions for comparison between the multiple sparkle contrasts.

An anti-glare layer manufacturing apparatus according to the present disclosure includes the comparing apparatus. The corrector corrects a sparkle contrast of an electronic display that is used as the comparison target with an anti-glare layer to be inspected being disposed on a surface. The comparator compares the sparkle contrast of the electronic display with the anti-glare layer to be inspected being disposed on the surface with a sparkle contrast meeting the acceptance standard that is used as the comparison standard.

According to the present disclosure, multiple sparkle contrasts in different measurement conditions can be appropriately compared.

DESCRIPTION OF EMBODIMENTS

Figure 1:
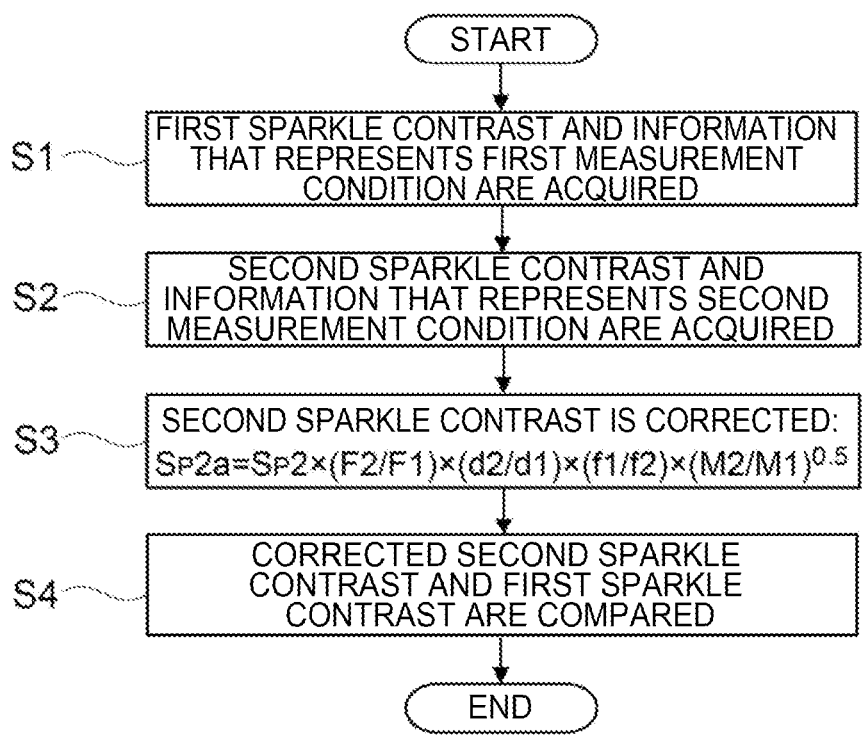
FIG. 1 is a flowchart illustrating a sparkle contrast comparing method according to the present embodiment.

An embodiment of the present disclosure will hereinafter be described with reference to the drawings. In the drawings attached to the present specification, a scale and an aspect ratio, for example, are appropriately changed from actual ones and exaggerated for convenience of ease of illustration and understanding.

Words such as "equivalent" and "same" and the values of a length and an angle that specify shapes, geometrical conditions, and the degree of these and that are used in the present specification, for example, are not limited by strict meaning but are interpreted to an extent that the same function can be expected.

Optical terms that are used in the present specification comply with optical terms in JISZ8120:2001. As for a term "predetermined characteristic" that is used in the present specification, the meaning of the "characteristic" includes any kind of characteristic such as an optical characteristic or a physical characteristic. In particular, the characteristic is needed for numerical formulas, correcting methods, manufacturing methods, and selecting methods in the present disclosure.

Figure 2:
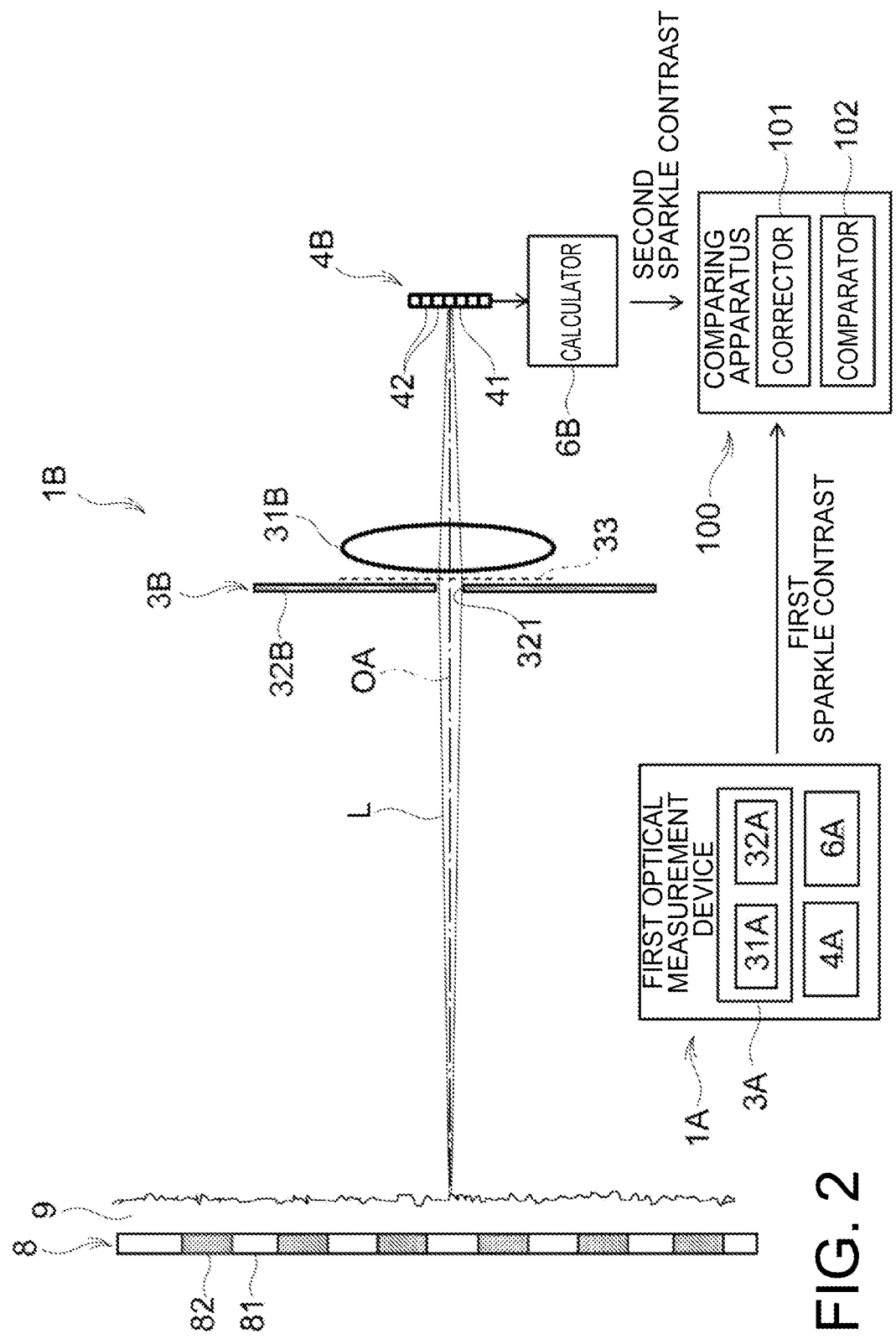
FIG. 2 illustrates an example of a measurement system that can be used for the sparkle contrast comparing method in FIG. 1.

FIG. 1 is a flowchart illustrating a sparkle contrast comparing method according to the present embodiment. FIG. 2 illustrates an example of a measurement system that can be used for the sparkle contrast comparing method in FIG. 1.

The sparkle contrast comparing method according to the present embodiment can be used to appropriately compare a sparkle contrast that is caused by an anti-glare layer that is disposed on a surface of a light-emitting electronic display even in the case of using different measurement conditions.

The sparkle is a phenomenon of flickering caused when a screen shows luminance distribution having a small pixel matrix size due to, for example, scattering and refraction that occur when light emitted from a pixel matrix of a display element of a display passes through, for example, a medium having fine unevenness and a refractive index modulation layer. The sparkle is also called a sparkle or sparkling but is expressed as the "sparkle" in the present specification. More specifically, the sparkle in the present specification means an irregular spatial modulation image that is formed as a result of imaging on a sensor surface of a visual system of an observer by using a combination of a pixel matrix of a direct view display and a diffusion layer that is disposed near a surface of the display.

The sparkle contrast means a sparkle value that is expressed as a percentage of total illuminance distribution data that is included in a sparkle pattern to an average value. The sparkle value means the standard deviation of the total illuminance distribution data that is included in the sparkle pattern. The sparkle pattern corresponds to illuminance distribution on a surface of an imaging element when a display screen of the display that is turned on in a single color is imaged within a measurement range. More specifically, the sparkle pattern means two-dimensional gradation data acquired by removing the influence of a pixel shape from two-dimensional illuminance distribution data in which an image component of the pixel shape of the display element of the display is invisible or illuminance distribution data in which the image component of the pixel shape of the display element of the display is visible, and the illuminance distribution data is acquired by imaging.

However, the sparkle contrast can be defined by using radiance distribution instead of the illuminance distribution as described later. That is, the sparkle contrast corresponds to a representative evaluation index that represents the degree of the sparkle and is defined as the following expression.

[Math. 13]

$$S_p = \frac{\sigma}{L} \quad (16)$$

In a numerical formula (16), σ is the standard deviation of the radiance distribution of a monochrome sparkle pattern on a surface of a two-dimensional image sensor for measurement. In the numerical formula (16), the average value of radiance of the monochrome sparkle pattern is expressed as the following.

[Math. 14]

$\bar{L}$

Luminance may be used as the denominator and the numerator of the right-hand side of the numerical formula (16) instead of the radiance.

The measurement system illustrated in FIG. 2 includes an electronic display 8, a first optical measurement device 1A, a second optical measurement device 1B, and a comparing apparatus 100 for comparison of the sparkle contrast.

The first optical measurement device 1A measures a first sparkle contrast that is used as a comparison standard. The second optical measurement device 1B measures a second sparkle contrast that is used as a comparison target. The comparing apparatus 100 compares the first sparkle contrast and the second sparkle contrast.

More specifically, the electronic display 8 includes a pixel matrix 81 and a black matrix 82, and an anti-glare layer 9 that serves as a diffusion layer is stacked on a surface thereof. An example of the anti-glare layer 9 is an optical diffusion layer that is disposed on the surface of the display 8 to reduce reflection light due to natural light. Examples of the black matrix 82 include another mechanism that acts as in the black matrix to prevent mixed colors in addition to the existing black matrix itself.

Figure 10:
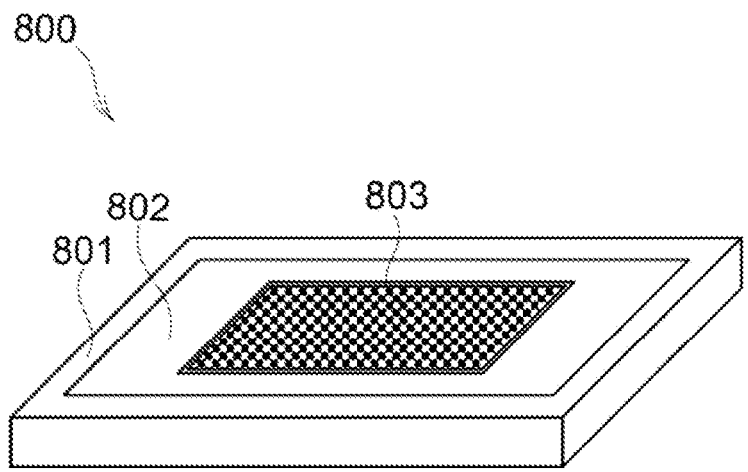
FIG. 10 is a perspective view of an example of a pseudo display that can be used for a sparkle contrast comparing method according to the present embodiment.

Examples of the electronic display 8 can include a liquid-crystal display, an organic EL display, a quantum dot (QD) display, a mini-LED display, and a micro-LED display. The electronic display 8 may be a pseudo display. The pseudo display has a structure in which a medium that imitates the pixel matrix is disposed on a planer diffuse light source. The pixel matrix may be directly disposed on the diffuse light source or may be stacked in another manner. As illustrated in, for example, FIG. 10, a pseudo display 800 can be manufactured in a manner in which a metal mask 803 that imitates pixels is installed on a light-emitting portion 802 of a planer white light source 801.

The anti-glare layer 9 is not particularly limited provided that the anti-glare layer 9 is a structure that has an antiglare function. The antiglare function is a function of causing a contour of, for example, an object or light reflected on the anti-glare layer to blur and to be unclear or a function of causing the reflected object or light itself to blur and to be unclear. The function can prevent sparkle and improve visibility of character information, a video, and an image to be displayed on the display. A surface of the anti-glare layer typically has unevenness and may have very fine unevenness, provided that the antiglare function is fulfilled. For example, the anti-glare layer 9 may be A: a multilayer body that includes a single layer or multiple layers having the antiglare function stacked on a base material, B: a base material that has a base material surface having the antiglare function, or C: a product such as a display or a color filter for evaluation that includes the A or B on a surface. A layer having the antiglare function in the anti-glare layer 9 may be located at any position between the multiple layers that are included in the anti-glare layer. The position may be any position of a visible position, a position inside the display, and a position between the visible position and the position inside the display or may include the multiple positions described above. The anti-glare layer 9 is disposed on the surface of the electronic display. This means that the anti-glare layer 9 is a member that is nearer than the pixel matrix 81 and the black matrix 82 of the electronic display 8 to the visible position and is disposed there such that the sparkle consequently occurs. In a more specific example, the anti-glare layer 9 may be acquired by providing glass or plastic with appropriate unevenness by using sandblasting or chemical etching. Alternatively, the anti-glare layer 9 may be acquired by providing a thin glass film or a plastic film of 100 µm or less with unevenness by coating the film with a reactive, organic or inorganic resin binder and/or organic or inorganic particles having various diameters and by hardening the coating. The anti-glare layer 9 may have embossment unevenness that is provided by using a mold or a shaped film. The anti-glare layer 9 may be acquired such that very fine unevenness is provided in a manner in which a coating composition of a mixture of the binder described above and organic or inorganic particles having a refractive index that differs from that of the binder, or a coating composition containing a binder of a mixture of multiple resins having low compatibility or multiple resins having different refractive indexes is coated or processed, is dried, and is hardened. A method of selecting the anti-glare layer 9 described later in [3. Anti-Glare layer Selecting Method and Product including Anti-Glare Layer] enables the anti-glare layer 9 that is good and that can reduce the sparkle to be readily acquired. As for a plastic film that is used for the anti-glare layer 9, the anti-glare layer 9 is preferably composed of acrylic resin, polyester resin, cyclic olefin resin, or cellulose resin but is not limited thereto. In the case where the anti-glare layer 9 is the multilayer body that includes the multiple layers, a low reflectivity layer that has a refractive index lower than the refractive index of the binder of the anti-glare layer and an antifouling layer to provide antifouling properties may be stacked. In this case, the entire multilayer body corresponds to the anti-glare layer 9. In the case where the anti-glare layer 9 is not provided, that is, in the case where resin components and particles that are included in the binder have different refractive indexes and even in the case of a flat structure that does not have the antiglare function, internal diffusion enables the sparkle to be observed, and accordingly, the sparkle contrast can be measured as in the anti-glare layer 9. An aspect of the internal diffusion includes a random structure as in the anti-glare layer 9.

As illustrated in FIG. 2, the second optical measurement device IF includes a second optical system 3B, a second two-dimensional image sensor 4B, and a second calculator 6B. The first optical measurement device 1A includes a first optical system 3A, a first two-dimensional image sensor 4A, and a first calculator 6A although this is not illustrated. The components of the optical measurement devices 1A and 1B will now be described in detail.

(Optical Systems 3A and 3B)

The second optical system 3B is a device that refracts emitted light L from the anti-glare layer 9 and images the light on a two-dimensional sensor array surface 41 of the second two-dimensional image sensor 4B. The first optical system 3A refracts emitted light L from the anti-glare layer 9 and images the light on a two-dimensional sensor array surface 41 of the first two-dimensional image sensor 4A.

The second optical system 3B includes a second imaging lens 31B and a second aperture stop 32B that has an opening 321. The first optical system 3A includes a first imaging lens 31A and a first aperture stop 32A as in the second optical system 3B.

The parameters of the optical systems 3A and 3B affect the magnitudes of the sparkle contrasts.

For example, the smaller the openings 321 of the aperture stops 32A and 32B, that is, the larger the F-numbers of the imaging lenses 31A and 31B, the greater the openings 321 of the aperture stops 32A and 32B affect the diffraction of the emitted light L. Significant diffraction of the emitted light L results in increasing spread of diffraction limit spots of the emitted light L that are imaged on the two-dimensional sensor array surfaces 41, that is, Airy disks. Consequently, each diffraction limit spot does not stay in a single pixel 42 of the two-dimensional image sensor 4A or 4B but spreads to another adjacent pixel 42.

The diffraction limit spots that are imaged on the pixels 42 of the two-dimensional image sensors 4A and 4B thus spread. Consequently, in the case where attention is paid to a specific pixel 42, the emitted light L that passes through different positions on the anti-glare layer 9 overlaps on the specific pixel 42, and the sparkle pattern is consequently averaged.

The higher the degrees of the averaged sparkle patterns on the pixels 42, the lower the sparkle contrasts. That is, the larger the F-numbers of the imaging lenses 31A and 31B, the more the sparkle contrasts due to the averaging effect on the pixels 42 reduce.

In the case where the average diameter of the particles that are included in the sparkle patterns that are formed on the two-dimensional sensor array surfaces 41 is smaller than those of the pixels 42 because the F-numbers are too small, the sparkle contrasts reduce. The sparkle contrasts reduce because the degree of the spread of the diffraction limit spots is small for each pixel 42, and the amount of light that each pixel 42 receives is consequently distributed. More specifically, the sparkle contrasts reduce because the output of each pixel 42 becomes equal to the integrated value of the sparkle pattern within the pixel 42 due to the distribution of the amount of the received light. That is, when the F-numbers of the imaging lenses 31A and 31B are too small, the sparkle contrasts reduce due to the effect of the integration of the sparkle pattern within the pixel 42.

The F-numbers of the imaging lenses 31 affect the sparkle contrasts as described above. Specifically, as the F-numbers increase, the contrasts reduce due to the effect of averaging as a result of different patterns overlapping on each pixel 42. The sparkle contrasts reduce also due to the effect of the integration within the pixel 42 along with the decrease in the F-numbers.

In an example illustrated in FIG. 2, the second imaging lens 31B includes a single lens. However, each of the imaging lenses 31A and 31B may include multiple lenses. In this case, the multiple lenses that are included in the imaging lenses 31A and 31B may have the power of a combination suitable to reduce the aberration of the emitted light L. The optical systems 3A and 3B may each include an optical filter 33. The optical filter 33 is an optical element that changes, for example, the intensity, complex amplitude, spectral distribution, and vibration surface of incident light and that emits the light. For example, the optical filter 33 may be a Y-filter that has an optically transparent characteristic that is based on a Y value function of XYZ color matching functions that are defined by International Commission on Illumination CIE1931. The optical filter 33 may be a XYZ filter that has an optically transparent characteristic that is based on the XYZ color matching functions that are defined by CIE1931. The optical filter 33 may be an RGB filter that has an optically transparent characteristic that is based on the RGB primary colors of the display. The optical filter 33 may be a linear polarization filter that converts the incident light into linearly polarized light and that emits the light. The optical filter 33 may be a circular polarization filter that converts the incident light into circularly polarized light and that emits the light. The optical filter 33 may be a ND filter that decreases the amount of the incident light and that emits the light. Examples of the optical filter 33 are not limited thereto. FIG. 2 illustrates an example in which the optical filter 33 is disposed between the second aperture stop 32B and the second imaging lens 31B. However, the number and position of the optical filter 33 is not limited to the example in FIG. 2. The aperture stops are not limited to a front aperture stop illustrated in FIG. 2 by way of example but may be aperture stops that are set inside lens structures.

(Two-Dimensional Image Sensors 4A and 4B)

The two-dimensional image sensors 4A and 4B are imaging elements on which the emitted light L from the anti-glare layer 9 is imaged. The two-dimensional image sensors 4A and 4B have the two-dimensional sensor array surfaces 41 and image the emitted light L.

The two-dimensional image sensors 4A and 4B include multiple pixels 42 adjacent to each other. The surfaces of the pixels 42 form the two-dimensional sensor array surfaces 41. The emitted light L that is received by the pixels 42 is converted into an electrical signal by using photoelectric conversion. The converted electrical signal is used to calculate the sparkle contrasts.

The two-dimensional image sensors 4A and 4B include solid state imaging elements, and examples thereof may include a CCD (Charge Coupled Device) sensor and a CMOS (Complementary Metal Oxide Semiconductor) sensor.

(Calculators 6A and 6B)

The calculators 6A and 6B calculate the sparkle contrasts, based on the images of the emitted light L that are imaged by the two-dimensional image sensors 4A and 4B. The calculators 6A and 6B calculate the sparkle contrasts in accordance with, for example, the numerical formula (16) described above. For example, the calculators 6A and 6B include hardware such as a CPU and a memory. Parts of the calculators 6A and 6B may be configured by using software. Measurement regions corresponding to pixel regions of the two-dimensional image sensors 4A and 4B that are used for calculation, that is, measurement of the sparkle contrasts preferably have a small statistical error. Specifically, when the measurement regions are too small, the statistical error corresponding to a sparkle contrast measurement error that is caused by a variation in average radiance that depends on locations, that is, the positions of the pixels is likely to increase. Accordingly, the measurement regions are preferably expanded as possible to an extent that the statistical error is small and acceptable. In some cases, a moire pattern emerges due to the pixel pitches of the two-dimensional image sensors 4A and 4B and the pitch of the pixel matrix 81 depending on the conditions of the optical systems 3A and 3B. The appropriate F-numbers of the optical systems 3A and 3B or appropriate measurement distances, that is, distances from the anti-glare layer 9 to the imaging lenses 31A and 31B are preferably selected to avoid the moire pattern. In the case where the moire pattern emerges, the calculators 6A and 6B or the comparing apparatus 100 described later preferably performs a filtering process to remove the moire pattern from the image later. In some cases, however, the filtering process not only removes the moire pattern but also affects a random component of the radiance due to the original sparkle patterns. Accordingly, as for the comparing apparatus 100, how the sparkle contrasts are affected by the filtering process is preferably considered to correctly compare the sparkle contrasts.

The structure of the comparing apparatus 100 will now be described. The comparing apparatus 100 includes a corrector 101 and a comparator 102.

The corrector 101 corrects the second sparkle contrast, based on a ratio between a first measurement condition and a second measurement condition for comparison with the first sparkle contrast. A specific aspect of correction of the second sparkle contrast will be described later together with the comparing method described later. The comparator 102 compares the second sparkle contrast that is corrected by the corrector 101 with the first sparkle contrast. The comparator 102 outputs the result of comparison.

(Sparkle Contrast Comparing Method)

A specific example of the sparkle contrast comparing method by using the measurement system in FIG. 2 will now be described.

As illustrated in FIG. 1, the corrector 101 first acquires the first sparkle contrast that is used as the comparison standard and that is measured in the first measurement condition and information that represents the first measurement condition by using the first imaging lens 31A that images the emitted light L from the anti-glare layer 9 and the first two-dimensional image sensor 4A on which the emitted light is imaged (a step S1).

The corrector 101 also acquires the second sparkle contrast that is measured in the second measurement condition and information that represents the second measurement condition by using the second imaging lens 31B that images the emitted light L from the anti-glare layer 9 and the second two-dimensional image sensor 4B on which the emitted light is imaged (a step S2). The order of the step S1 and the step S2 may be changed. The step S1 and the step S2 may be simultaneously performed.

Subsequently, the corrector 101 corrects the second sparkle contrast, based on the ratio between the first measurement condition and the second measurement condition for comparison with the first sparkle contrast (a step S3). The second sparkle contrast is corrected in accordance with a numerical formula (1) described below.

$$S_P2a = S_P2 \times (F2/F1) \times (d2/d1) \times (f1/f2) \times (M2/M1)^{0.5} \quad (1)$$

In the numerical formula (1), $S_P2a$ is the second sparkle contrast that is corrected. $S_P2$ is the second sparkle contrast that is not corrected. F1 is the image effective F-number of the first imaging lens 31A, included in the first measurement condition. F2 is the image effective F-number of the second imaging lens 31B, included in the second measurement condition. d1 is a distance from the anti-glare layer 9 to the first imaging lens 31A, that is, the measurement distance, included in the first measurement condition. d2 is a distance from the anti-glare layer 9 to the second imaging lens 31B, included in the second measurement condition. f1 is the effective focal length of the first imaging lens 31A, included in the first measurement condition. f2 is the effective focal length of the second imaging lens 31B, included in the second measurement condition. M1 is a value that is calculated by a numerical formula (2) described below. M2 is a value that is calculated by a numerical formula (3) described below. In some cases, M1 and M2 are called integration parameters.

[Math. 15]

$$M1 = \left[\sqrt{\frac{Ac1}{Am1}}\,\mathrm{erf}\left(\sqrt{\frac{\pi\,Am1}{Ac1}}\right) - \left(\frac{Ac1}{\pi\,Am1}\right)\left\{1 - \exp\left(-\frac{\pi\,Am1}{Ac1}\right)\right\}\right]^{-2} \quad (2)$$

In the numerical formula (2), Ac1 is a parameter expressed as $(((4/\pi) \times F1 \times \lambda)/2)^2 \times \pi$, where $\lambda$ is the wavelength of the emitted light L. Ac1 corresponds to the area of a circle that has a diameter equal to the size R1 of a diffraction limit spot on the first two-dimensional image sensor 4A described later. Am1 is a parameter expressed as $p1^2$, where p1 is the pixel pitch of the first two-dimensional image sensor 4A, included in the first measurement condition. Am1 corresponds to the area of a single pixel of the sensor 4A. erf is a standard error function.

[Math. 16]

$$M2 = \left[\sqrt{\frac{Ac2}{Am2}}\,\mathrm{erf}\left(\sqrt{\frac{\pi\,Am2}{Ac2}}\right) - \left(\frac{Ac2}{\pi\,Am2}\right)\left\{1 - \exp\left(-\frac{\pi\,Am2}{Ac2}\right)\right\}\right]^{-2} \quad (3)$$

In the numerical formula (3), Ac2 is a parameter expressed as $(((4/\pi) \times F2 \times \lambda)/2)^2 \times n$, where $\lambda$ is the wavelength of the emitted light L. Ac2 corresponds to the area of a circle that has a diameter equal to the size R2 of a diffraction limit spot on the second two-dimensional image sensor 4B described later. Am2 is a parameter expressed as $p2^2$, where p2 is the pixel pitch of the second two-dimensional image sensor 4B, included in the second measurement condition. Am2 corresponds to the area of a single pixel of the sensor 4B. erf is the standard error function.

After the second sparkle contrast is corrected, the comparator 102 compares the second sparkle contrast that is corrected, that is, a corrected contrast and the first sparkle contrast, that is, a non-corrected contrast (a step S4).

The correction of the second sparkle contrast in accordance with the numerical formula (1) corresponds to adjustment of the second measurement condition that is made later such that the sizes of light-emitting regions on the anti-glare layer 9 contributory to imaging the diffraction limit spots of the emitted light L on the two-dimensional image sensors 4A and 4B are equal to each other between the first measurement condition and the second measurement condition.

The sizes of the light-emitting regions on the anti-glare layer 9 contributory to imaging the diffraction limit spots of the emitted light L on the two-dimensional image sensors 4A and 4B are defined as a numerical formula (7) and a numerical formula (8) described below, based on the sizes of the diffraction limit spots and the optical magnifications of the imaging lens 31A and 31B that are calculated by using the focal lengths of the imaging lenses 31A and 31B and the distances from the anti-glare layer 9 to the imaging lenses 31A and 31B.

[Math. 17]

$$S1 = \frac{R1}{m1} \propto \frac{F1}{m1} = F1\frac{d1}{f1} = F1' \quad (7)$$

In the numerical formula (7), S1 is the size of the light-emitting region on the anti-glare layer 9 contributory to imaging the diffraction limit spot of the emitted light on the first two-dimensional image sensor 4A, included in the first measurement condition. R1 is the size of the diffraction limit spot on the first two-dimensional image sensor 4A, that is, the size of the Airy disk. m1 is the optical magnification of the first imaging lens 31A, included in the first measurement condition. F1 is the image effective F-number of the first imaging lens 31A, included in the first measurement condition. d1 is the distance from the anti-glare layer 9 to the first imaging lens 31A, included in the first measurement condition. f1 is the effective focal length of the first imaging lens 31A, included in the first measurement condition. F1' is the object effective F-number of the first imaging lens 31A, included in the first measurement condition.

[Math. 18]

$$S2 = \frac{R2}{m2} \propto \frac{F2}{m2} = F2\frac{d2}{f2} = F2' \quad (8)$$

In the numerical formula (8), S2 is the size of the light-emitting region on the anti-glare layer 9 contributory to imaging the diffraction limit spot of the emitted light on the second two-dimensional image sensor 4B, included in the second measurement condition. R2 is the size of the diffraction limit spot on the second two-dimensional image sensor 4B. m2 is the optical magnification of the second imaging lens 31B, included in the second measurement condition. F2 is the image effective F-number of the second imaging lens 31B, included in the second measurement condition. d2 is the distance from the anti-glare layer 9 to the second imaging lens 31B, included in the second measurement condition. f2 is the effective focal length of the second imaging lens 31B, included in the second measurement condition. F2' is the object effective F-number of the second imaging lens 31B, included in the second measurement condition.

The numerical formula (1) corresponds to multiplication of the second sparkle contrast $S_P2$ by (S2/S1). A sparkle contrast $S_P$ is proportional to a reciprocal 1/S of the size S of a light-emitting region on the anti-glare layer contributory to imaging a diffraction limit spot of the emitted light on a two-dimensional image sensor. Accordingly, the numerical formula (1) corresponds to multiplication of $S_P2$ in the right-hand side by $S_P1/S_P2$, that is, matching the second sparkle contrast $S_P2a$ that is corrected in the left-hand side to the first sparkle contrast $S_P1$. Matching the sparkle contrast corresponds to matching S proportional to the reciprocal of the sparkle contrast. Accordingly, the correction of the second sparkle contrast $S_P2$ in accordance with the numerical formula (1) is equivalent to that the first measurement condition and the second measurement condition later satisfy a numerical formula (6) expressed as:

$$S1=S2. \quad (6)$$

Figure 3:
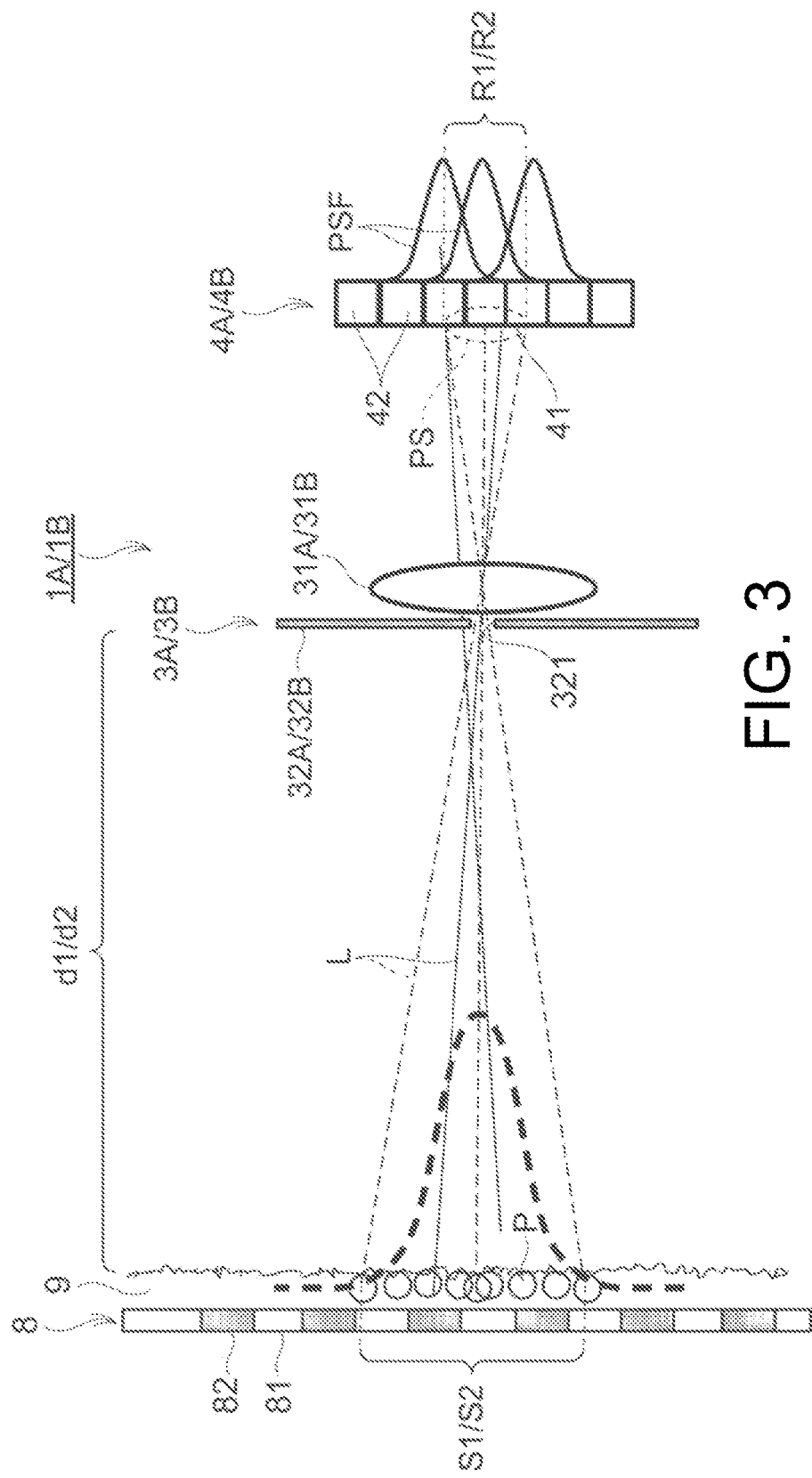
FIG. 3 is a diagram for describing the sparkle contrast comparing method in FIG. 1.

As illustrated in FIG. 3, the emitted light L from a single point on the anti-glare layer 9 is imaged on the two-dimensional sensor array surface 41 of the two-dimensional image sensor 4A or 4B in accordance with a PSF (a point spread function). More specifically, the emitted light L from the single point on the anti-glare layer 9 is imaged as a diffraction limit spot PS across the multiple pixels 42, that is, a point image. FIG. 3 illustrates the two-dimensional image sensors 4A and 4B that are enlarged unlike FIG. 2 for convenience of description of the spread of the diffraction limit spot PS in accordance with the PSF.

The diffraction limit spot PS with a single pixel 42 centered is received by not only the single pixel 42 but also another pixel 42. Accordingly, it can be thought that the emitted light L from multiple light-emitting points P on the anti-glare layer 9 is contributory to imaging the diffraction limit spot PS on the single pixel 42.

The light-emitting region on the anti-glare layer 9 contributory to imaging the diffraction limit spot PS of the emitted light L on each two-dimensional sensor array surface 41 can be thought as an aggregation of the multiple light-emitting points P. Accordingly, as illustrated in FIG. 3, the size of the light-emitting region can be thought as the size S1 or S2 of an image acquired by projecting the diffraction limit spot PS of the two-dimensional image sensor 4A or 4B on the anti-glare layer 9 via the imaging lens 31A or 31B. FIG. 3 illustrates a projection image of the diffraction limit spot PS on the anti-glare layer 9 as the projection image of the PSF. In an example illustrated in FIG. 3, the projection image of the diffraction limit spot PS on the anti-glare layer 9 is larger than that of the diffraction limit spot PS. The optical magnification of each optical system 3 is involved in the projection image being larger than that of the diffraction limit spot PS.

When the size S1 of the light-emitting region on the anti-glare layer 9 contributory to imaging the diffraction limit spot PS matches the size S2 thereof, compatibility between the sparkle contrasts based on the emitted light L that is imaged in different measurement conditions can be ensured. The reason is as follows.

In the case where coherence is reduced to an extent that the emitted light L incident on the pixels 42 from the light-emitting points P on the anti-glare layer 9 is incoherent or is regarded as being incoherent, the emitted light L from the light-emitting points P on the anti-glare layer 9 does not substantially interfere on the pixels 42. That is, wavefronts of light simply overlap on the pixels 42. Element sparkle patterns that are formed from the light-emitting points P are independent of each other and differ from each other due to the random structure of the anti-glare layer 9.

As a result, a diffraction limit spot group in which the sparkle is averaged is formed depending on the number of the light-emitting points P on the anti-glare layer 9 corresponding to the pixels 42. The degree of the average of the sparkle depends on the number of the light-emitting points P on the anti-glare layer 9 corresponding to the pixels 42, that is, the sizes S1 and S2 of the light-emitting regions on the anti-glare layer 9.

Accordingly, matching the size S1 of the light-emitting region on the anti-glare layer 9 to the size S2 thereof enables the sparkle contrasts to be compared in the same standard such that the degree of the average of the sparkle is shared even in the different measurement conditions.

For the reason described above, since the compatibility between the sparkle contrasts can be ensured, the corrector 101 corrects the second sparkle contrast in accordance with the numerical formula (1) such that an equivalent to matching S2 to S1 is achieved.

With this configuration, the second sparkle contrast that is used as the comparison target and that is measured in the second measurement condition that differs from the first measurement condition is corrected in accordance with the numerical formula (1). Consequently, the compatibility between the first sparkle contrast that is used as the comparison standard and that is measured in the first measurement condition and the second sparkle contrast that is corrected can be ensured. This enables the multiple sparkle contrasts in the different measurement conditions to be appropriately compared.

Between the first measurement condition and the second measurement condition, structural conditions of the electronic display 8, the anti-glare layer 9, and the optical measurement devices 1A and 1B that include the imaging lenses 31A and 31B and the two-dimensional image sensors 4A and 45 may be the same, and measurement conditions including the distances from the anti-glare layer 9 to the imaging lenses 31A and 31B with the optical measurement devices 1A and 1B may differ.

Alternatively, between the first measurement condition and the second measurement condition, the structural conditions of the electronic display 8 and the anti-glare layer 9 may be the same, structural conditions of the optical measurement devices 1A and 1B that include the imaging lenses 31A and 31B and the two-dimensional image sensors 4A and 4B may differ, and measurement conditions including the distances from the anti-glare layer 9 to the imaging lenses 31A and 31B with the optical measurement devices 1A and 1B may differ.

Alternatively, between the first measurement condition and the second measurement condition, structural conditions of the electronic display 8 and the optical measurement devices 1A and 1B that include the imaging lenses 31A and 31B and the two-dimensional image sensors 4A and 4B may be the same, structural conditions of the anti-glare layer 9 may differ, and measurement conditions including the distances from the anti-glare layer 9 to the imaging lenses 31A and 31B with the optical measurement devices 1A and 1B may differ.

An example of the use of the sparkle contrast comparing method will now be described.

[1. Electronic Display Manufacturing Method]

The sparkle contrast comparing method according to the present embodiment and those according to modifications described later can be used to inspect whether an electronic display to be inspected and to be a product meets the acceptance standard of sparkle contrast in a process of manufacturing the electronic display. In this case, a sparkle contrast meeting the acceptance standard is used as the first sparkle contrast. The sparkle contrast of an object to be inspected is used as the second sparkle contrast. For example, the comparator 102 of the comparing apparatus 100 compares the sparkle contrast of the object to be inspected that is corrected by the corrector 101 of the comparing apparatus 100 with the sparkle contrast meeting the acceptance standard. If the result of comparison is determined that a difference between the sparkle contrast of the object to be inspected that is corrected and the sparkle contrast meeting the acceptance standard is small, the comparator 102 may output the result of determination that the electronic display to be inspected is an accepted product. If it is determined that the difference between the sparkle contrast of the object to be inspected that is corrected and the sparkle contrast meeting the acceptance standard is large, the comparator 102 may output the result of determination that the electronic display to be inspected is a rejected product. Whether the difference between the sparkle contrast of the object to be inspected that is corrected and the sparkle contrast meeting the acceptance standard is small may be determined in accordance with a determination standard such as a threshold for a predetermined sparkle contrast difference. The sparkle contrast of the object to be inspected may be used as the first sparkle contrast, and the sparkle contrast meeting the acceptance standard may be used as the second sparkle contrast.

The anti-glare layer 9 may not be disposed on a surface of the electronic display to be inspected itself. In this case, the anti-glare layer 9 for inspection is disposed on the surface of the electronic display to measure the sparkle contrast when whether the acceptance standard is met is inspected. The anti-glare layer 9 for inspection has a predetermined characteristic. For example, the anti-glare layer 9 may have a predetermined structure and size. In this case, the conditions of the anti-glare layer 9 are shared between multiple different electronic displays to be inspected. For this reason, a difference in optical characteristic between the multiple electronic displays to be inspected results in a difference between the sparkle contrasts. That is, in the case where there is the difference between the sparkle contrasts of the multiple electronic displays to be inspected, it can be considered that the difference is not caused by the difference in optical characteristic of the anti-glare layer 9. Whether the electronic display to be inspected meets the acceptance standard is thus inspected in inspection conditions in which the conditions of the anti-glare layer 9 are shared, and the inspection can be consequently appropriately conducted. For example, an electronic display that is supposed to be an accepted product can be inhibited from being mistakenly determined as a rejected product due to the influence of the difference in optical characteristic of the anti-glare layer 9. An electronic display that is manufactured through a process of comparing the sparkle contrasts can have a good optical characteristic meeting the acceptance standard of sparkle contrast.

The anti-glare layer 9 may be disposed on the surface of the electronic display to be inspected, that is, an electronic display device.

[2. Anti-Glare Layer Manufacturing Method]

The sparkle contrast comparing method according to the present embodiment and those according to the modifications described later can be used to inspect whether the anti-glare layer 9 to be inspected and to be a product meets the acceptance standard of sparkle contrast in a process of manufacturing the anti-glare layer 9. In this case, the sparkle contrast meeting the acceptance standard is used as the first sparkle contrast. The sparkle contrast of an electronic display with the anti-glare layer 9 to be inspected being disposed on a surface is used as the second sparkle contrast. For example, the comparator 102 compares the sparkle contrast meeting the acceptance standard with the sparkle contrast of the electronic display that is corrected by the corrector 101 with the anti-glare layer 9 to be inspected being disposed on the surface. If the result of comparison is determined that a difference between the corrected sparkle contrast of the electronic display with the anti-glare layer 9 to be inspected being disposed on the surface and the sparkle contrast meeting the acceptance standard is small, the comparator 102 may output the result of determination that the anti-glare layer 9 to be inspected is an accepted product. If it is determined that the difference between the corrected sparkle contrast of the electronic display with the anti-glare layer 9 to be inspected being disposed on the surface and the sparkle contrast meeting the acceptance standard is large, the comparator 102 may output the result of determination that the anti-glare layer 9 to be inspected is a rejected product. Whether the difference between the corrected sparkle contrast of the electronic display with the anti-glare layer 9 to be inspected being disposed on the surface and the sparkle contrast meeting the acceptance standard is small may be determined in accordance with the determination standard such as the threshold for the predetermined sparkle contrast difference. The sparkle contrast of the electronic display with the anti-glare layer 9 to be inspected being disposed on the surface may be used as the first sparkle contrast. The sparkle contrast meeting the acceptance standard may be used as the second sparkle contrast.

The anti-glare layer 9 to be inspected is disposed on the surface of the electronic display for inspection to measure the sparkle contrast when whether the acceptance standard is met is inspected. The electronic display for inspection has a predetermined characteristic. For example, the electronic display for inspection may have a predetermined structure and size. The electronic display for inspection may be shared between multiple anti-glare layers 9 to be inspected, that is, may be repeatedly used.

In the case where the electronic display for inspection that is used thus has the predetermined characteristic, the conditions of the electronic display are shared between the multiple anti-glare layers 9 to be inspected. For this reason, a difference in optical characteristic between the multiple anti-glare layers 9 to be inspected results in a difference between the sparkle contrasts. That is, in the case where there is the difference between the sparkle contrasts of the multiple anti-glare layers 9 to be inspected, it can be considered that the difference is not caused by the difference in optical characteristic of the electronic display. Whether the anti-glare layer 9 to be inspected meets the acceptance standard is thus inspected in inspection conditions in which the conditions of the electronic display are shared, and the inspection can be consequently appropriately conducted. For example, the anti-glare layer 9 that is supposed to be an accepted product can be inhibited from being mistakenly determined as a rejected product due to the influence of the difference in optical characteristic of the electronic display. The anti-glare layer 9 that is manufactured through the process of comparing the sparkle contrasts can have a good optical characteristic meeting the acceptance standard of sparkle contrast.

Specific aspects of the anti-glare layer 9 to be inspected are not particularly limited. For example, the aspects may include the above A: the multilayer body that includes the single layer or the multiple layers having the antiglare function stacked on the base material. In the case where the anti-glare layer is the multilayer body, the anti-glare layer 9 to be inspected is formed in a manner in which the single layer or the multiple layers having the antiglare function are formed on the base material. An example of the base material can be an optically transparent base material in the form of sheet. The material of the optically transparent base material is not particularly limited, and examples thereof may include resin such as plastic and glass. The resin may be thermoplastic resin or thermosetting resin.

The layer or layers having the antiglare function may be formed in a manner in which an anti-glare layer composition that contains resin is applied to the optically transparent base material, and the applied resin is cured. An example of the anti-glare layer composition may be a composition acquired by mixing at least an oligomer or a polymer and at least a curable resin precursor in an appropriate solution. The oligomer or the polymer may be curable or may not be curable. The anti-glare layer composition may further contain fine particles. An example of the oligomer or the polymer may be thermoplastic resin. The curable resin precursor, the curable oligomer, and the curable polymer can be various curable compounds that are cured or crosslinked by using heat or ionizing radiation such as ultraviolet rays or electron beams and that enable resin such as curable resin or crosslinked resin to be formed. The fine particles may be inorganic fine particles or organic fine particles. Examples of the fine particles may include plastic beads. The composition may contain various additives such as a photocurable initiator, a leveling agent, a special wavelength absorber, a refractive index modifier, an antistatic agent, a dye, a pigment, and an antioxidant.

A method of applying the anti-glare layer composition to the base material is not particularly limited but may be a known method such as a spin coating method, a dipping method, a splaying method, a die coating method, a bar coating method, a roll coating method, a meniscus coating method, a flexographic printing method, a screen printing method, or a bead coating method.

After the anti-glare layer composition is applied by using any one of the methods described above, a formed coating is transported to a heated zone for drying, the formed coating is dried by using one of various known methods, and a solvent is evaporated. At this time, the relative evaporation rate of the solvent, a solid concentration, the temperature of the applied liquid, a dry temperature, the speed of drying wind, a dry time, and the concentration of a solvent atmosphere in the zone for drying, for example, are selected, and the state of the distribution of the organic fine particles and the inorganic fine particles can be consequently adjusted.

The anti-glare layer composition may be cured by using heat or radiation of active energy rays. An example of a method of emitting the ionizing radiation is a method of using a light source such as an ultra-high-pressure mercury lamp, a high-pressure mercury lamp, a low-pressure mercury lamp, a carbon discharge lamp, a black-light fluorescent lamp, or a metal halide lamp. The wavelength of the ultraviolet rays can be in a wavelength band of 190 to 380 nm. Specific examples of an electron beam source include various electron beam accelerators such as a Cockcroft-Walton accelerator, a Van de Graaff accelerator, a resonant transformer accelerator, an insulating core transformer, a linear accelerator, a Dynamitron accelerator, and a radio-frequency accelerator.

The anti-glare layer 9 to be inspected may have an uneven surface. Examples of a method of forming the uneven surface of the anti-glare layer 9 may include (1) a method of adding the fine particles into the anti-glare layer composition described above, that is, mixing and dispersing, (2) a method of forming a phase separation structure by spinodal decomposition along with the evaporation of the solvent in the anti-glare layer composition without adding the fine particles, (3) a process of shaping the unevenness, (4) an embossment process, and a combination of (1) to (4).

[3. Anti-Glare Layer Selecting Method and Product Including Antiglare Layer]

The sparkle contrast comparing method according to the present embodiment and those according to the modifications described later can be used for the method of selecting the anti-glare layer 9 and a product that includes the anti-glare layer 9 that is selected by using the selecting method. Examples of the anti-glare layer 9 that is used in the method of selecting the anti-glare layer 9 can include the anti-glare layers 9 that have various aspects and that are manufactured by using a method of manufacturing the multilayer body described in [2. Anti-Glare Layer Manufacturing Method] and another manufacturing method.

In the method of selecting the anti-glare layer 9, a first measurement contrast of the electronic display that is measured by the first optical measurement device with a first anti-glare layer 9 being disposed on the surface is used as the sparkle contrast that is used as the comparison standard. An example of the first optical measurement device may be the first optical measurement device 1A illustrated in FIG. 2. In the method of selecting the anti-glare layer 9, a second measurement contrast of the electronic display that is measured by the second optical measurement device with a second anti-glare layer 9 being disposed on the surface is used as the sparkle contrast that is used as the comparison target. The electronic display itself that is used to measure the second measurement contrast is the same as the electronic display itself that is used to measure the first measurement contrast. The second anti-glare layer 9 differs from the first anti-glare layer 9. An example of the second optical measurement device can be the second optical measurement device 1B illustrated in FIG. 2.

That is, in the method of selecting the anti-glare layer 9, the first measurement contrast and the second measurement contrast are compared by using the sparkle contrast comparing method described above along with the correction of one of the contrasts.

The first anti-glare layer 9 or the second anti-glare layer 9 is selected based on the result of comparison between the first measurement contrast and the second measurement contrast. Specifically, an anti-glare layer having a good measurement contrast is selected from the first anti-glare layer 9 and the second anti-glare layer 9. More specifically, an anti-glare layer having a low measurement contrast is selected from the first anti-glare layer 9 and the second anti-glare layer 9. The anti-glare layer 9 may be selected in this way after both of the first anti-glare layer 9 and the second anti-glare layer 9 are determined as accepted products in [2. Anti-Glare Layer Manufacturing Method] described above.

The anti-glare layer 9 that is selected by using the present method is included in a product such as an electronic display or a polarizer or a display element that is included in the electronic display and can have a good optical characteristic. Specific aspects of the display element differ depending on the kind of the electronic display. For example, in the case where the electronic display is a LCD (a liquid-crystal display), the display element is a liquid-crystal display panel. For example, the LCD includes the liquid-crystal display panel, a surface material, and the polarizer. In the case where the electronic display is an OLED (an organic light-emitting diode), the display element is a display element of the OLED. For example, the OLED includes the display element, the surface material, and the polarizer. In some cases, the OLED includes no polarizer. The display element may be a display element of a mini-LED or a micro-LED that is another example of the electronic display. For example, the mini-LED and the micro-LED can include the display element, the surface material, and the polarizer. In some cases, the mini-LED and the micro-LED include no polarizer. The display element described above is included in the electronic display 8. The display element includes the pixels, the pixel matrix 81, and the black matrix 82.

Other than this, the anti-glare layer 9 that is selected by using the present method is effectively used for any electronic display. In recent years, the image quality of televisions having a size of 30 inches, 40 inches, or 50 inches or more, monitors having a size of 15 inches, 20 inches, or 30 inches or more, and notebook PCs having a size of 10 inches or more, 15 inches or more, or 17 inches or more has been improved as known as HD (high-definition televisions), FHD (full high-definition televisions), 4K, and 8K having wide areas. These have a pixel density (the number of pixels per inch) of 110 dpi to 350 dpi. The pixel density is also referred to as ppi in some cases. The pixel density according to the present disclosure is the physical pixel density of the display element of the display. In the case where the resolution of various display elements can be changed, the pixel density is the maximum pixel density.

Figure 11:
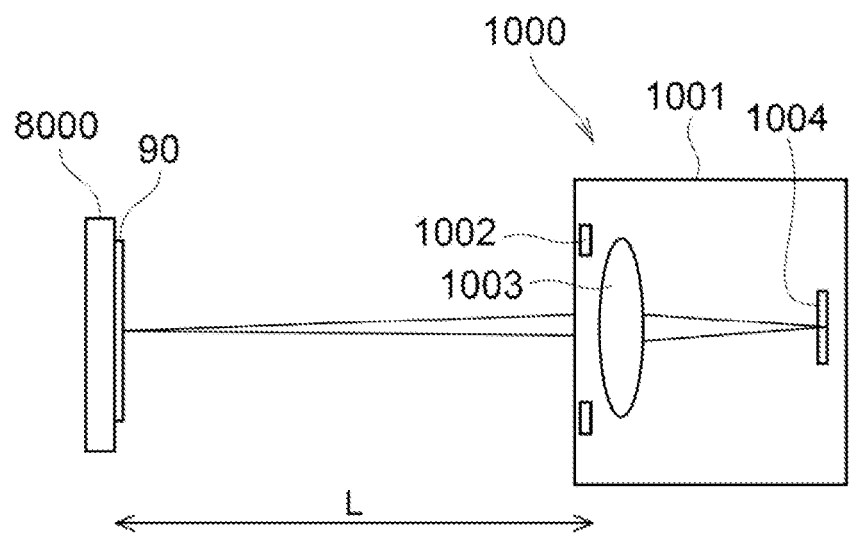
FIG. 11 illustrates a specific measurement system for sparkle contrast.

For example, if a sparkle contrast value is 0.05, preferably, 0.03 or less in the case where the anti-glare layer 9 is included in a 138-dpi notebook PC, it can be thought that antiglare properties are good. in comparison with electronic displays having wide areas described above, the sizes of on-board displays, tablet displays, and smartphones have been decreased in recent years, and many of these have a high pixel density of 150 dpi to 900 dpi so as to be capable of displaying a large amount of information even with a small screen size. For example, if the sparkle contrast value is 0.07 or less, preferably 0.05 or less, more preferably 0.04 or less in the case where these are included in 423-dpi smartphones, it can be thought that the antiglare properties are good. As illustrated in FIG. 11, these sparkle contrast values are measured in a manner in which an anti-glare layer 90 is included in a display 8000 having a pixel density of 138 dpi or 423 dpi as described above, and a measurement unit 1000 is used in a measurement condition suitable for the pixel density. The measurement unit 1000 includes an aperture stop 1002, a lens 1003, and a CCD 1004 that are contained in a housing 1001. The lens 1003 is a single-focus camera lens having a size of 60 mm. The CCD 1004 is a cooling CCD to reduce the measurement error as possible. A specific measurement condition with the measurement unit 1000 includes as follows.

[Measurement Condition for 13.3 inches and 138 dpi]
(1) display condition: full screen
(2) subpixel pitch Pp during full output lighting with only green light G: about 185 μm
(3) pixel pitch P L of the imaging element of the measurement unit: 5.5 μm
(4) image effective F-number F $\#_{image}$ of the imaging lens: 36.4
(5) imaging element pixel region used to calculate the contrast value: 128×128
(6) measurement distance L corresponding to the distance from an object principal point on the imaging lens to a display matrix surface: 500 mm
(7) optical magnification m: 0.136
(8) ISR (Image Sampling Ratio) defined as $P_F \times m/P_L$: 4.59
(9) angle formed between the display surface and the optical axis of the measurement unit: 90°
(10) A step of removing the pixel shape is performed because the pixel shape is visible.

[Measurement Condition for 5.2 inches and 423 dpi]
(1) display condition: full screen
(2) $P_F$: about 60 μm
(3) $P_L$: 5.5 μm
(4) F $\#_{image}$: 36.4
(5) imaging element pixel region used to calculate the contrast value: 128×128
(6) L: 500 mm
(7) m: 0.136
(8) ISR: 1.49
(9) angle formed between the display surface and the optical axis of the measurement unit: 90°
(10) The step of removing the pixel shape is not performed because the pixel shape is invisible.

For 138 dpi, the step of removing an image component of the pixel shape of the display element is performed. The step is performed in a manner in which the Fourier transform is applied to the imaged image, a regular, periodic component that is generated due to the image component of the pixel shape of the display is removed from the image to which the Fourier transform is applied, and subsequently, the inverse Fourier transform is applied.

The present method enables the sparkle contrast values that are measured by the different optical measurement devices to be compared without re-measurement and enables the optimum anti-glare layer for the polarizer or the display element of the electronic display to be readily selected.

[4. Display Element Selecting Method and Product Including Display Element]

The sparkle contrast comparing method according to the present embodiment and those according to the modifications described later can be used for a display element selecting method and a product that includes the display element that is selected by using the selecting method. Specific aspects of the display element are not particularly limited. For example, the liquid-crystal display panel of the LCD described above, the display element of the OLED, the display element of the mini-LED, and the display element of the micro-LED may be acceptable.

In the display element selecting method, a third measurement contrast that is measured by a third optical measurement device with a third anti-glare layer 9 being disposed on a surface of a first display element, that is, in a state of the electronic display is used as the sparkle contrast that is used as the comparison standard. An example of the third optical measurement device can be the first optical measurement device 1A illustrated in FIG. 2. In the display element selecting method, a fourth measurement contrast that is measured by a fourth optical measurement device with the third anti-glare layer 9 being disposed on a surface of a second display element is used as the sparkle contrast that is used as the comparison target. The second display element differs from the first display element. The third anti-glare layer 9 that is used to measure the fourth measurement contrast has the same optical characteristic as the anti-glare layer 9 that is used to measure the third measurement contrast. The fourth optical measurement device differs from the third optical measurement device. An example of the fourth optical measurement device can be the second optical measurement device 1B illustrated in FIG. 2.

That is, in the display element selecting method, the third measurement contrast and the fourth measurement contrast are compared by using the sparkle contrast comparing method described above along with the correction of one of the contrasts.

The first display element or the second display element is selected based on the result of comparison between the third measurement contrast and the fourth measurement contrast. Specifically, a display element having a good measurement contrast is selected from the first display element and the second display element. The display element that is selected by using the present method is included in the electronic display and can have a good optical characteristic.

According to the present embodiment, the second sparkle contrast is corrected based on the ratio between the first measurement condition and the second measurement condition, and the first sparkle contrast and the second sparkle contrast in the different measurement conditions can be consequently appropriately compared as described above.

The embodiment is described above by using specific examples. The specific examples described above do not limit the embodiment. The embodiment described above can be carried out by using other various specific examples, and various components can be omitted, replaced, or modified, and an additional component can be added without departing from the spirit thereof.

Other specific examples will now be described with reference to the drawings to further describe the above embodiment. In the following description and the drawings that are used for the following description, components that can be the same as those in the specific examples described above are designated by using reference characters like to those used for corresponding components in the specific examples described above.

(First Modification)

Figure 4:
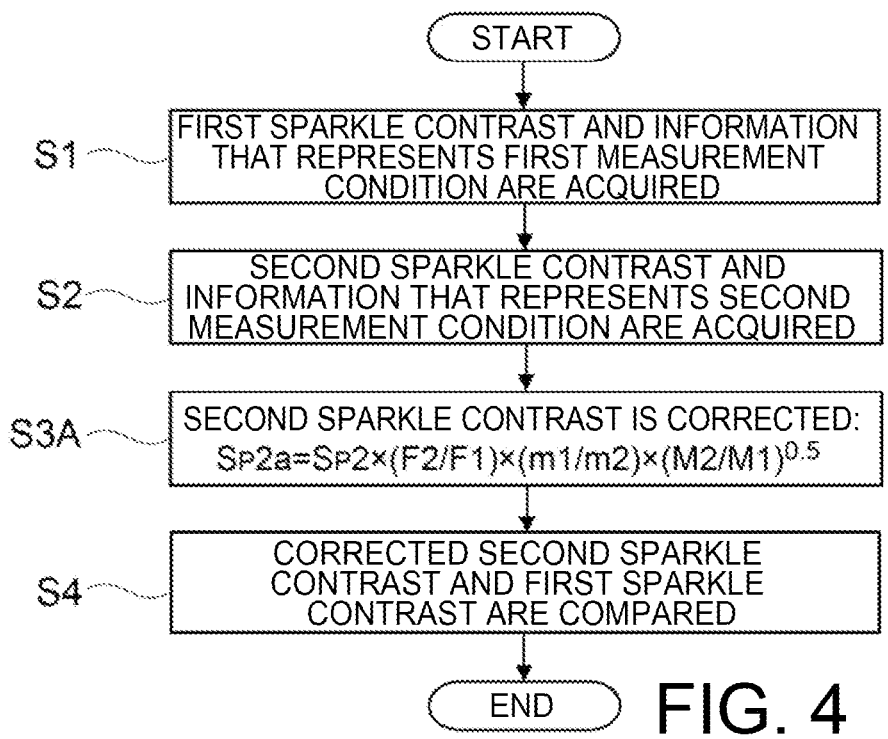
FIG. 4 is a flowchart illustrating a sparkle contrast comparing method according to a first modification to the present embodiment.

FIG. 4 is a flowchart illustrating a sparkle contrast comparing method according to a first modification to the present embodiment. FIG. 1 illustrates an example in which the second sparkle contrast is corrected in accordance with the numerical formula (1). In an example illustrated in FIG. 4, however, the second sparkle contrast is corrected in accordance with a numerical formula (4) described below (a step S3A).

$$S_P2a = S_P2 \times (F2/F1) \times (m1/m2) \times (M2/M1)^{0.5} \quad (4)$$

Here, m1, d1, and f1 satisfy a relationship of m1=f1/d1. Similarly, m2, d2, and f2 satisfy a relationship of m2=f2/d2. Accordingly, the same relational expression as the numerical formula (1) is acquired by modifying the numerical formula (4). That is, the correction of the second sparkle contrast in accordance with the numerical formula (4) is equivalent to that S1=S2 is satisfied as in the correction in accordance with the numerical formula (1).

Accordingly, the example illustrated in FIG. 4 enables the first sparkle contrast and the second sparkle contrast in the different measurement conditions to be appropriately compared as in the case of FIG. 1.

(Second Modification)

Figure 5:
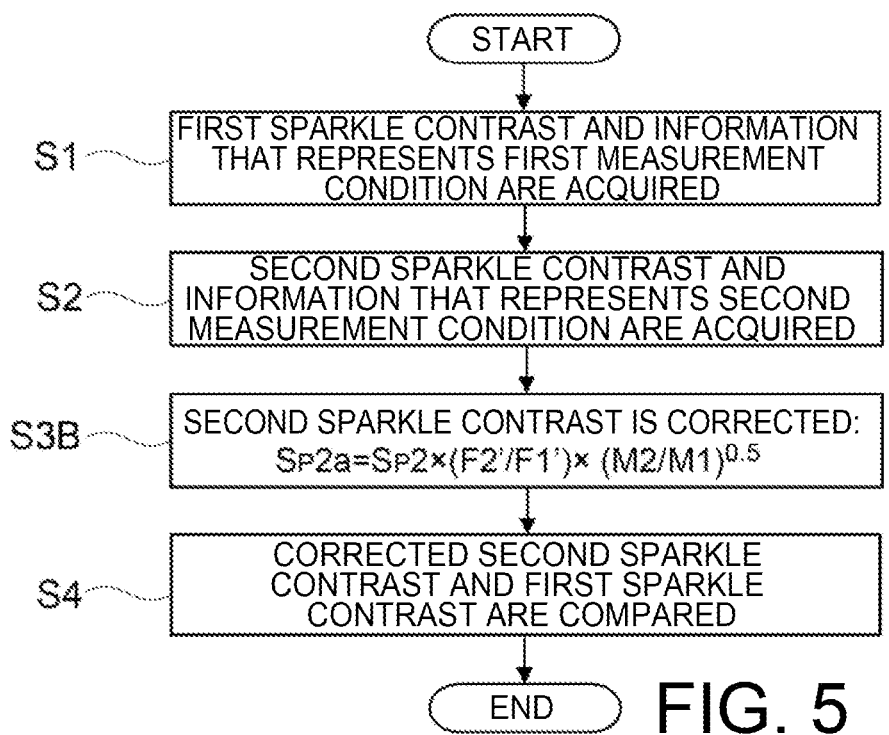
FIG. 5 is a flowchart illustrating a sparkle contrast comparing method according to a second modification to the present embodiment.

FIG. 5 is a flowchart illustrating a sparkle contrast comparing method according to a second modification to the present embodiment. In an example illustrated in FIG. 5, the second sparkle contrast is corrected in accordance with a numerical formula (5) described below (a step S3B).

$$S_P2a = S_P2 \times (F2'/F1') \times (M2/M1)^{0.5} \quad (5)$$

Here, F1' and F1 satisfy a relationship of F1'=F1/m1, and F2' and F2 satisfy a relationship of F2'=F2/m2. Accordingly, the same relational expression as the numerical formula (4) is acquired by modifying the numerical formula (5). That is, the correction of the second sparkle contrast in accordance with the numerical formula (5) is equivalent to that S1=S2 is satisfied as in the correction in accordance with the numerical formula (4).

Accordingly, the example illustrated in FIG. 5 enables the first sparkle contrast and the second sparkle contrast in the different measurement conditions to be appropriately compared as in the case of FIG. 4.

(Third Modification)

Figure 6A:
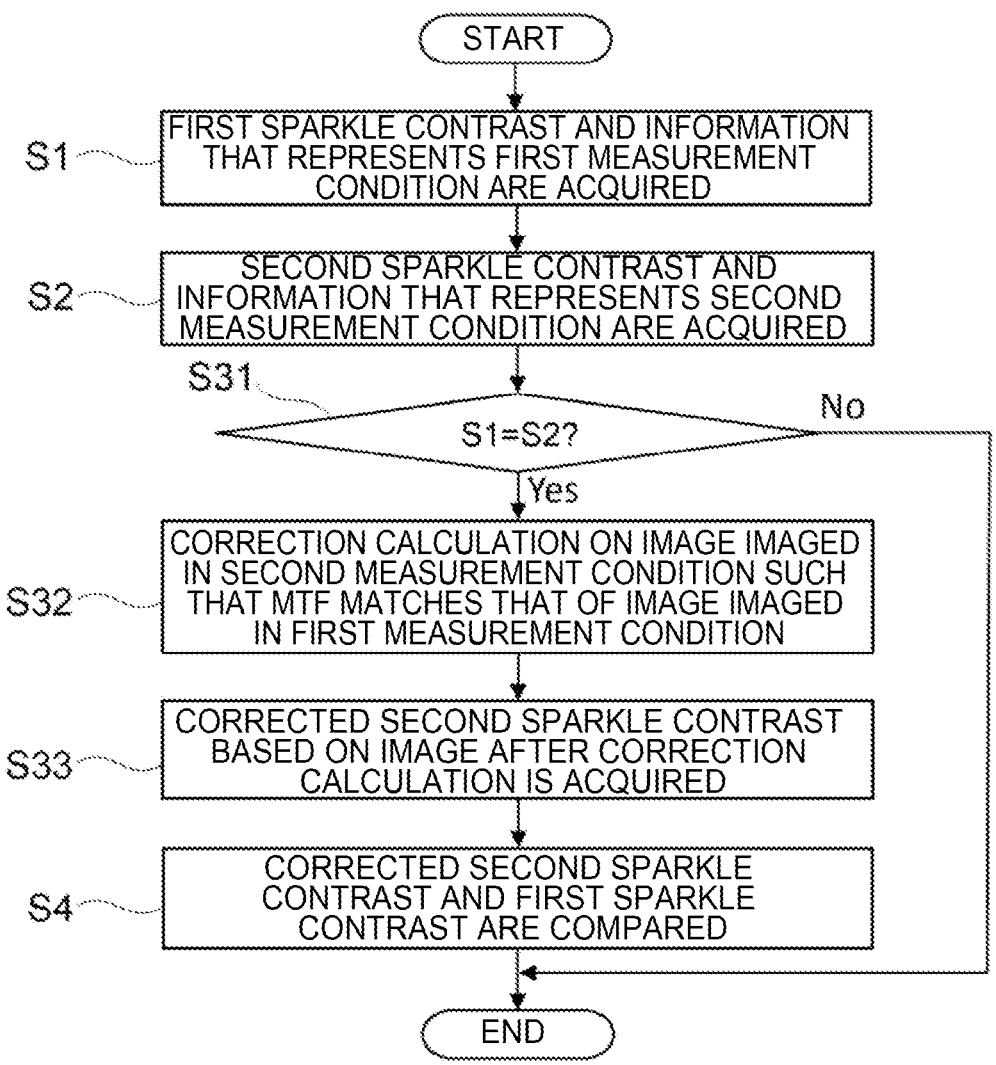
FIG. 6A is a flowchart illustrating an example of a sparkle contrast comparing method according to a third modification to the present embodiment.

FIG. 6A is a flowchart illustrating a sparkle contrast comparing method according to a third modification to the present embodiment. In the examples described above, the second sparkle contrast is corrected such that S1=S2 is satisfied, and the second sparkle contrast that is compatible with the first sparkle contrast is consequently acquired. In an example illustrated in FIG. 6A, however, an error in sparkle contrast due to the influence of the aberration is considered, and the second sparkle contrast can be compared with the first sparkle contrast with higher precision than the case where S1=S2 is satisfied.

Specifically, the corrector 101 acquires the first sparkle contrast and the information that represents the first measurement condition (the step S1), acquires the second sparkle contrast and the information that represents the second measurement condition (the step S2), and subsequently determines whether the relational expression of S1=S2 in the numerical formula (6) described above is satisfied (a step S31).

If S1=S2 is satisfied (Yes at the step S31), the corrector 101 makes a correction calculation on the image of the emitted light that is imaged in the second measurement condition such that a MTF (Modulation Transfer Function) that is calculated based on the image matches that of the image of the emitted light that is imaged in the first measurement condition (a step S32). In contrast, if S1=S2 is not satisfied (No at the step S31), processing ends.

Figure 7:
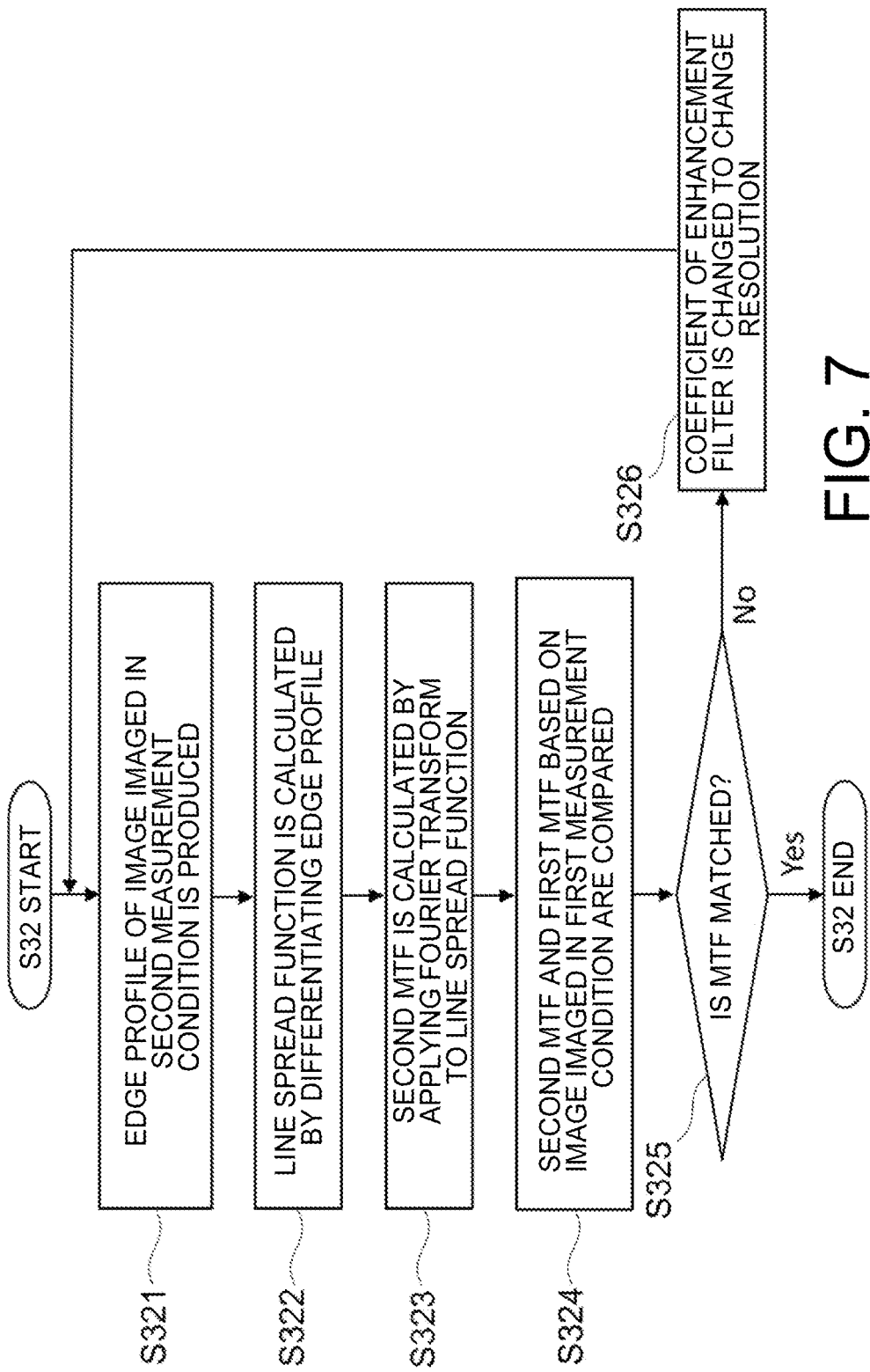
FIG. 7 is a flowchart illustrating an example of the detail of some steps in the flowcharts in FIG. 6A to FIG. 6C.

FIG. 7 is a flowchart illustrating a detailed example of the correction calculation (the step S32) in the flowchart in FIG. 6A. The correction calculation on the image of the emitted light that is imaged in the second measurement condition may be made in accordance with, for example, the flowchart in FIG. 7.

Specifically, the corrector 101 first produces the edge profile of the image of the emitted light that is imaged in the second measurement condition (a step S321). The edge profile is information that represents a variation in the pixel value of an edge portion of the image of the emitted light that is imaged in the second measurement condition. The edge profile may be produced, for example, by applying a technique disclosed in JP2020-25224A.

After the edge profile is produced, the corrector 101 calculates a line spread function by differentiating the edge profile (a step S322).

After the line spread function is calculated, the corrector 101 calculates a second MTF by applying the Fourier transform to the calculated line spread function (a step S323).

After the second MTF is calculated, the corrector 101 compares the calculated second MTF and a first MTF that is calculated based on the image of the emitted light that is imaged in the first measurement condition (a step S324).

As a result of comparison, the corrector 101 determines whether the second MTF matches the first MTF (a step S325).

If the second MTF matches the first MTF (Yes at the step S325), the corrector 101 ends the correction calculation and acquires the second sparkle contrast that is corrected, based on the image of the emitted light after the correction calculation as illustrated in FIG. 6A (a step S33).

If the second MTF does not match the first MTF (No at the step S325), the corrector 101 changes the coefficient of an enhancement filter for adjusting the resolution of the image of the emitted light that is imaged in the second measurement condition to change the resolution of the image (a step S326). A technique disclosed in JP2020-25224A, for example, may be applied to change the resolution by using the enhancement filter. Subsequently, processing after the step S321 is repeated on the image the resolution of which is changed. An example illustrated in FIG. 7 merely corresponds to an example of the correction calculation, and the correction calculation may be made by using another method other than that in FIG. 7.

The example illustrated in FIG. 6A enables the first sparkle contrast and the second sparkle contrast in the different measurement conditions to be appropriately compared.

Figure 6B:
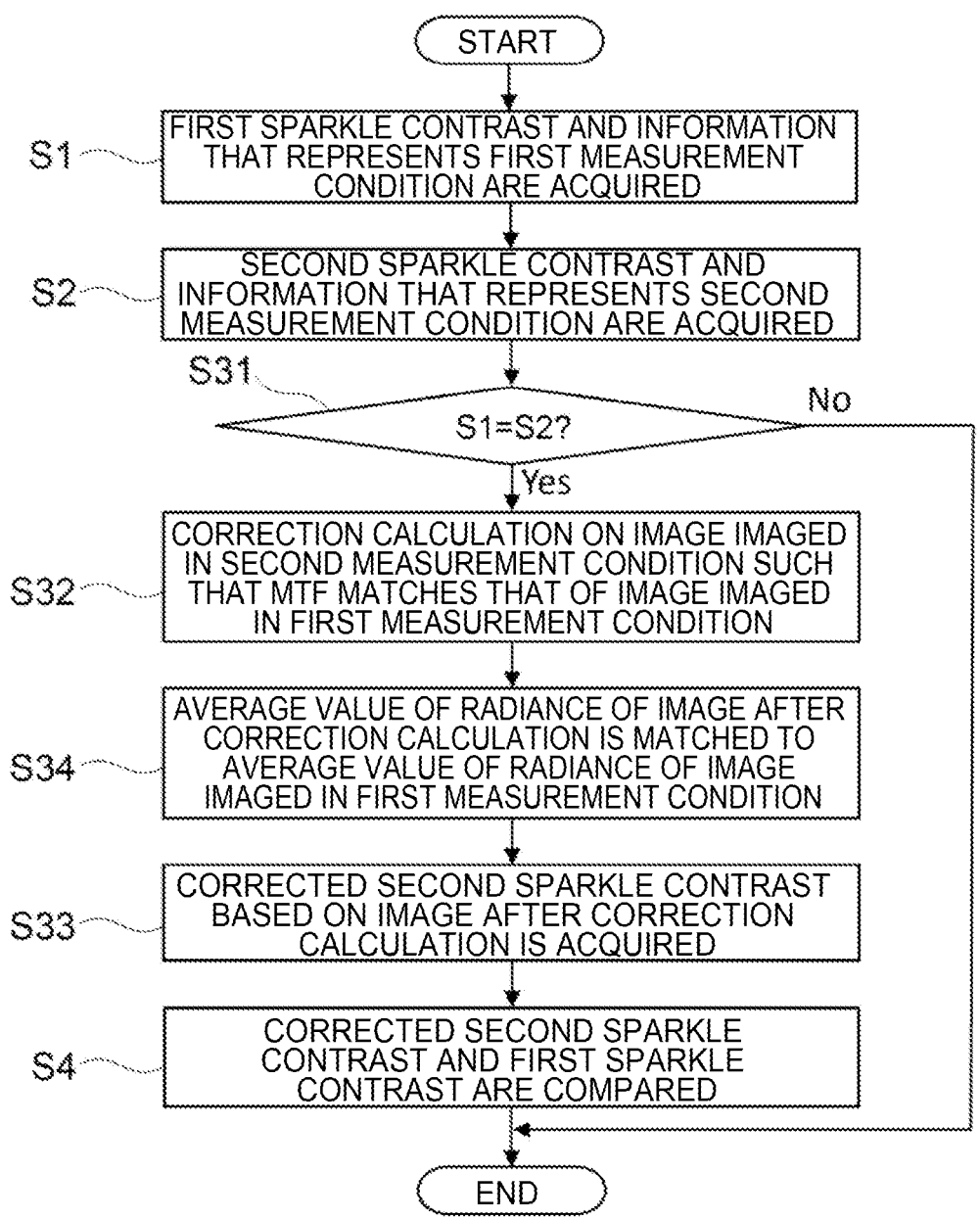
FIG. 6B is a flowchart illustrating another example of the sparkle contrast comparing method according to the third modification to the present embodiment unlike FIG. 6A.

As illustrated in FIG. 6B, the corrector 101 may perform a step S34 between the step S32 and the step S33. The step S34 is a step of matching the average value of radiance of an image that is acquired by making the correction calculation on the image of the emitted light that is imaged in the second measurement condition to the average value of radiance of the image of the emitted light that is imaged in the first measurement condition.

Figure 6C:
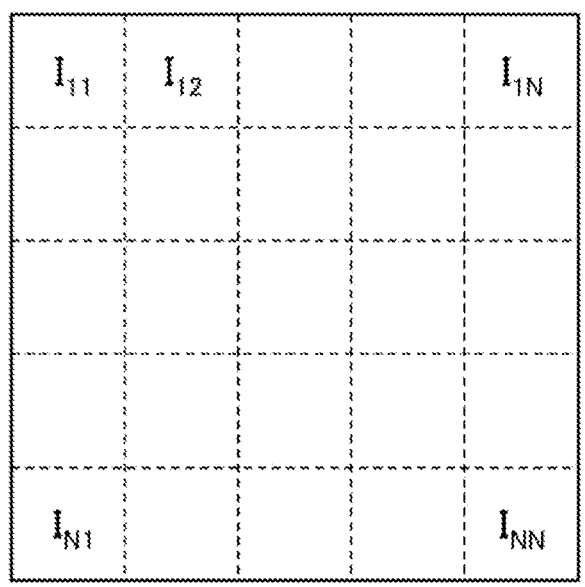
FIG. 6C is a diagram for describing some steps in the flowchart in FIG. 6B.

Specifically, at the step S34, the corrector 101 divides the image that is acquired by making the correction calculation into multiple regions (X, Y) that are arranged in a matrix in an X-direction and a Y-direction as illustrated in FIG. 6C. The corrector 101 multiplies radiance data of all pixels in the divided regions (X, Y) by a parameter expresses as:

[Math. 19]

$$\frac{\overline{I}}{I_{XY}}$$

where the following expression is the average value of radiance of the image of the emitted light that is imaged in the first measurement condition, which is acquired in advance, and $I_{XY}$ is local average luminance in the regions (X, Y).

[Math. 20]

$$\overline{I}$$

The step S34 enables the average value of radiance in all of the regions (X, Y) of the image that is acquired by making the correction calculation to match the average value of radiance of the image of the emitted light that is imaged in the first measurement condition. At the step S33 following the step S34, the corrector 101 acquires the second sparkle contrast that is corrected, based on the image after the correction calculation that has the average value of radiance that matches that of the image of the emitted light that is imaged in the first measurement condition.

Figure 6D:
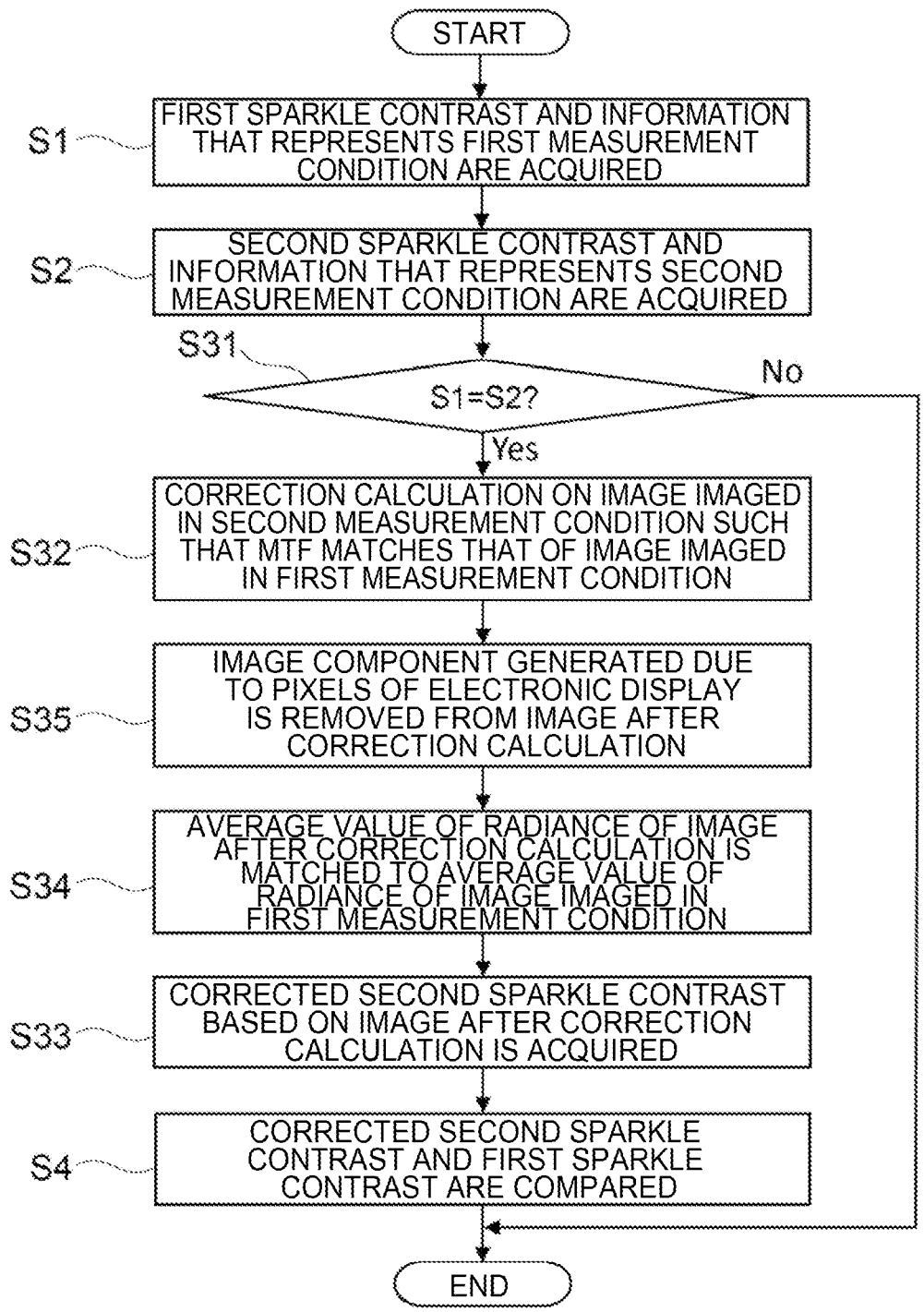
FIG. 6D is a flowchart illustrating another example of the sparkle contrast comparing method according to the third modification to the present embodiment unlike FIG. 6A and FIG. 6B.

As illustrated in FIG. 6D, the corrector 101 may perform a step S35 between the step S32 and the step S34. The step S35 is a step of removing the image component of the pixel shape that is generated due to the pixels of the display element of the electronic display 8 from the image that is acquired by making the correction calculation at the step S32. For example, the step S35 may be performed in a manner in which the Fourier transform is applied to the image that is acquired by making the correction calculation, a regular, periodic component that is generated due to the pixels of the electronic display 8 is removed from the image to which the Fourier transform is applied, and subsequently, the inverse Fourier transform is applied. Consequently, at the step S34 following the step S35, the average value of radiance of the image after the correction calculation from which the image component of the pixel shape that is generated due to the pixels of the display element of the electronic display 8 is remove is matched to that of the image of the emitted light that is imaged in the first measurement condition.

(Fourth Modification)

Figure 8:
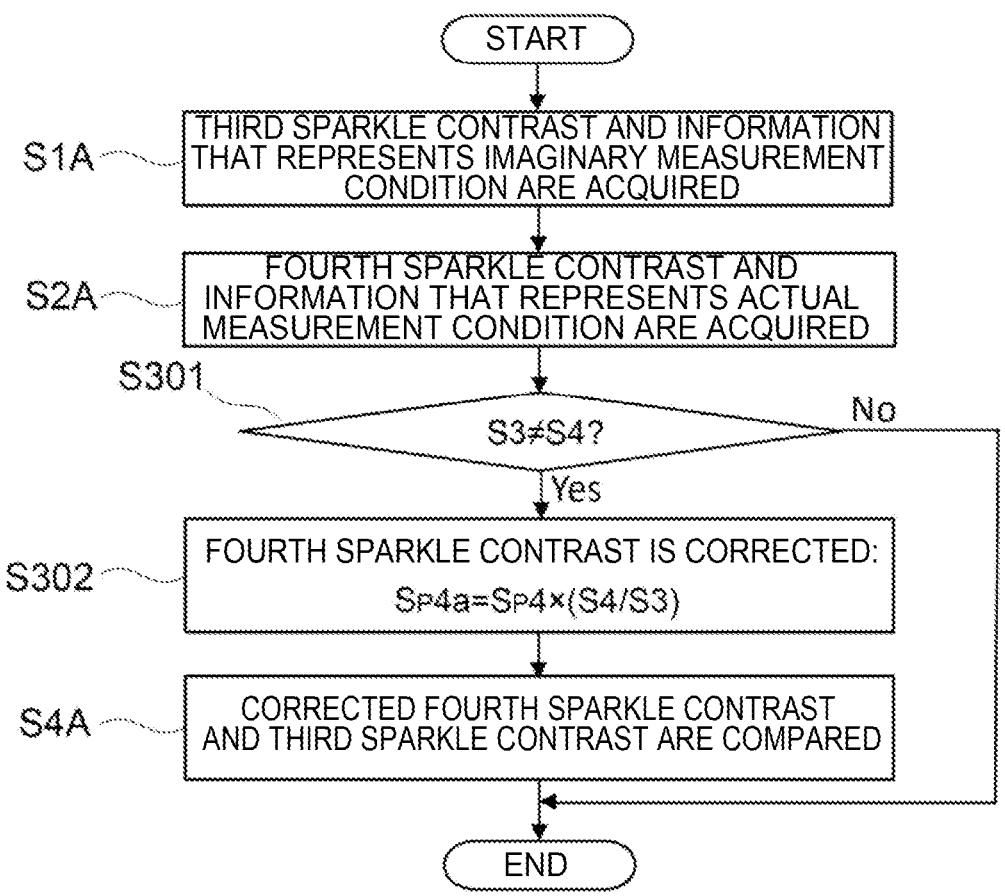
FIG. 8 is a flowchart illustrating a sparkle contrast comparing method according to a fourth modification to the present embodiment.

FIG. 8 is a flowchart illustrating a sparkle contrast comparing method according to a fourth modification to the present embodiment. In the above description, the sparkle contrast that is used as the comparison standard is actually measured in an actual measurement condition. In an example illustrated in FIG. 8, however, the sparkle contrast that is used as the comparison standard is a sparkle contrast that is imaginarily measured in an imaginary measurement condition.

Specifically, as illustrated in FIG. 8, the corrector 101 first acquires a third sparkle contrast that is used as the comparison standard and that is imaginarily measured in the imaginary measurement condition by using an imaginary imaging lens that images the emitted light from the anti-glare layer 9 and an imaginary two-dimensional image sensor on which the emitted light is imaged, and information that represents the imaginary measurement condition (a step S1A).

The corrector 101 acquires a fourth sparkle contrast that is used as the comparison target and that is actually measured in the actual measurement condition by using an actual imaging lens that images the emitted light from the anti-glare layer 9 and an actual two-dimensional image sensor on which the emitted light is imaged, and information that represents the actual measurement condition (a step S2A).

Subsequently, the corrector 101 determines whether the imaginary measurement condition and the actual measurement condition satisfy a numerical formula (9) described below (a step S301).

$$S3 \neq S4 \tag{9}$$

In the numerical formula (9), S3 is the size of the light-emitting region on the anti-glare layer 9 contributory to imaging the diffraction limit spot of the emitted light from the anti-glare layer 9 on the two-dimensional image sensor, included in the imaginary measurement condition, and satisfies a numerical formula (11) described below. S4 is the size of the light-emitting region on the anti-glare layer 9 contributory to imaging the diffraction limit spot of the emitted light from the anti-glare layer 9 on the two-dimensional image sensor, included in the actual measurement condition, and satisfies a numerical formula (12) described below.

[Math. 21]

$$S3 = \frac{R3}{m3} \propto \frac{F3}{m3} = F3\frac{d3}{f3} = F3' \tag{9}$$

In the numerical formula (11), R3 is the size of the diffraction limit spot on the two-dimensional image sensor. m3 is the optical magnification of the imaginary imaging lens, included in the imaginary measurement condition. F3 is the image effective F-number of the imaginary imaging lens, included in the imaginary measurement condition. d3 is a distance from the anti-glare layer 9 to the imaginary imaging lens, included in the imaginary measurement condition. f3 is the effective focal length of the imaginary imaging lens, included in the imaginary measurement condition. F3' is the object effective F-number of the imaginary imaging lens, included in the imaginary measurement condition.

[Math. 22]

$$S4 = \frac{R4}{m4} \propto \frac{F4}{m4} = F4\frac{d4}{f4} = F4' \tag{12}$$

In the numerical formula (12), R4 is the size of the diffraction limit spot on the two-dimensional image sensor. m4 is the optical magnification of the actual imaging lens, included in the actual measurement condition. F4 is the image effective F-number of the actual imaging lens, included in the actual measurement condition. d4 is a distance from the anti-glare layer 9 to the actual imaging lens, included in the actual measurement condition. f4 is the effective focal length of the actual imaging lens, included in the actual measurement condition. F4' is the object effective F-number of the actual imaging lens, included in the actual measurement condition.

If the numerical formula (9) is satisfied (Yes at the step S301), the corrector 101 corrects the fourth sparkle contrast in accordance with a numerical formula (10) described below (a step S302).

$$S_P 4a = S_P 4 \times (S4/S3) \tag{10}$$

In the numerical formula (10), $S_P 4a$ is the fourth sparkle contrast that is corrected. $S_P 4$ is the fourth sparkle contrast that is not corrected.

If the numerical formula (9) is not satisfied (No at the step S301), the corrector 101 ends processing.

After the fourth sparkle contrast is corrected, the comparator 102 compares the fourth sparkle contrast that is corrected and the third sparkle contrast (a step S4A).

The example illustrated in FIG. 8 enables the sparkle contrast that is used as the comparison target to be appropriately compared even in the case where the sparkle contrast that is used as the comparison standard is imaginarily set. The comparison standard is imaginarily set, and the degree of freedom of the comparison standard can be consequently improved.

(Fifth Modification)

Figure 9:
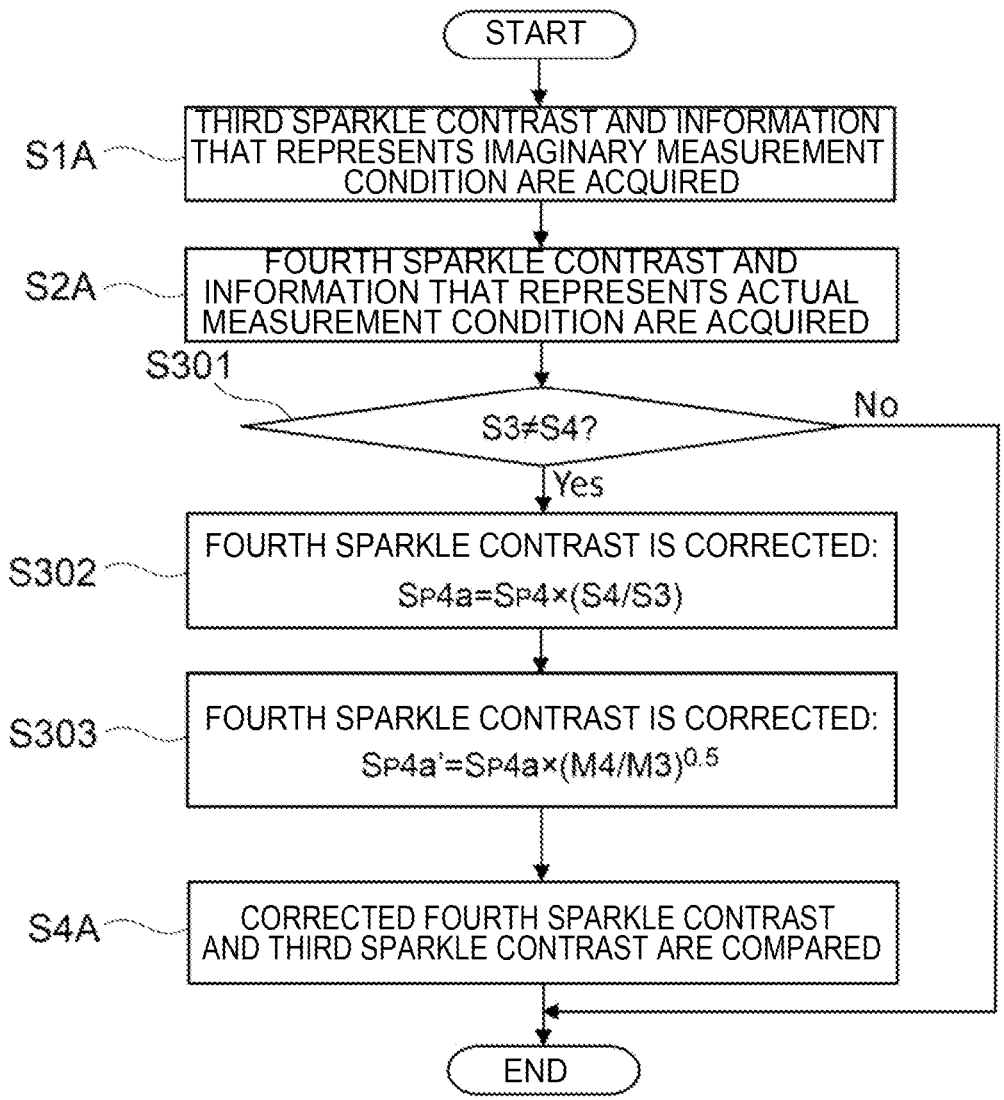
FIG. 9 is a flowchart illustrating a sparkle contrast comparing method according to a fifth modification to the present embodiment.

FIG. 9 is a flowchart illustrating a sparkle contrast comparing method according to a fifth modification to the present embodiment. As illustrated in FIG. 9, the fourth sparkle contrast may be further corrected in accordance with a numerical formula (13) described below after the fourth sparkle contrast is corrected in accordance with the numerical formula (10) described above (a step S303).

$$S_P 4a' = S_P 4a \times (M4/M3)^{0.5} \tag{13}$$

In the numerical formula (13), $S_P 4a'$ is the fourth sparkle contrast that is corrected in accordance with the numerical formula (13). M3 is a value that is calculated by using a numerical formula (14) described below. M4 is a value that is calculated by using a numerical formula (15) described below.

[Math. 23]

$$M3 = \left[\sqrt{\frac{Ac3}{Am3}}\,\mathrm{erf}\left(\sqrt{\frac{\pi\,Am3}{Ac3}}\right) - \left(\frac{Ac3}{\pi\,Am3}\right)\left\{1 - \exp\left(-\frac{\pi\,Am3}{Ac3}\right)\right\}\right]^{-2} \tag{14}$$

In the numerical formula (14), Ac3 is a parameter expressed as $(((4/\pi) \times F3 \times \lambda)/2)^2 \times n$, where $\lambda$ is the wavelength of the emitted light from the anti-glare layer. Am3 is a parameter expressed as $p3^2$, where p3 is the pixel pitch of the two-dimensional image sensor, included in the imaginary measurement condition. erf is the standard error function.

[Math. 24]

$$M4 = \left[\sqrt{\frac{Ac4}{Am4}}\,\mathrm{erf}\left(\sqrt{\frac{\pi\,Am4}{Ac4}}\right) - \left(\frac{Ac4}{\pi\,Am4}\right)\left\{1 - \exp\left(-\frac{\pi\,Am4}{Ac4}\right)\right\}\right]^{-2} \tag{15}$$

In the numerical formula (15), Ac4 is a parameter expressed as $(((4/\pi) \times F4 \times \lambda)/2)^2 \times n$, where $\lambda$ is the wavelength of the emitted light from the anti-glare layer. Am4 is a parameter expressed as $p4^2$, where p4 is the pixel pitch of the two-dimensional image sensor, included in the imaginary measurement condition. erf is the standard error function.

An example illustrated in FIG. 9 enables the fourth sparkle contrast to be appropriately corrected even in the case where the F-number of the imaging lens differs between the imaginary measurement condition and the actual measurement condition. Accordingly, the sparkle contrast that is imaginarily measured in the imaginary measurement condition and the sparkle contrast that is actually measured in the actual measurement condition can be more appropriately compared.

A large number of the modifications that can be used for the embodiment described above are described above. Multiple modifications can be appropriately combined and used.

The invention claimed is:

1. A sparkle contrast correcting method comprising: a step of acquiring a first sparkle contrast that is caused by an anti-glare layer that is disposed on a surface of an electronic display and information that represents a first measurement condition, the first sparkle contrast being used as a comparison standard and being measured in the first measurement condition by using a first imaging lens that images emitted light from the anti-glare layer and a first two-dimensional image sensor on which the emitted light is imaged;
   a step of acquiring a second sparkle contrast that is caused by the anti-glare layer and information that represents a second measurement condition, the second sparkle contrast being used as a comparison target and being measured in the second measurement condition that differs from the first measurement condition by using a second imaging lens that images emitted light from the anti-glare layer and a second two-dimensional image sensor on which the emitted light is imaged; and
   a step of correcting the second sparkle contrast, based on a ratio between the first measurement condition and the second measurement condition for comparison with the first sparkle contrast.

2. The sparkle contrast correcting method according to claim 1, wherein the step of correcting the second sparkle contrast is performed in accordance with a numerical formula (1) expressed as:

$$S_p2a = S_p2 \times (F2/F1) \times (d2/d1) \times (f1/f2) \times (M2/M1)^{0.5}, \quad (1)$$

where $S_p2a$ is the second sparkle contrast that is corrected,
$S_p2$ is the second sparkle contrast that is not corrected,
F1 is an image effective F-number of the first imaging lens, included in the first measurement condition,
F2 is an image effective F-number of the second imaging lens, included in the second measurement condition,
d1 is a distance from the anti-glare layer to the first imaging lens, included in the first measurement condition,
d2 is a distance from the anti-glare layer to the second imaging lens, included in the second measurement condition,
f1 is an effective focal length of the first imaging lens, included in the first measurement condition,
f2 is an effective focal length of the second imaging lens, included in the second measurement condition,
M1 is a value that is calculated by using a numerical formula (2), and
M2 is a value that is calculated by using a numerical formula (3), the numerical formula (2) being expressed as:

[Math. 1]

$$M1 = \left[ \sqrt{\frac{Ac1}{Am1}} \, \text{erf}\left(\sqrt{\frac{\pi \, Am1}{Ac1}}\right) - \left(\frac{Ac1}{\pi \, Am1}\right)\left\{1 - \exp\left(-\frac{\pi \, Am1}{Ac1}\right)\right\} \right]^{-2} \quad (2)$$

where Ac1 is a parameter expressed as $(((4/\pi) \times F1 \times \lambda)/2)^2 \times \pi$, where $\lambda$ is a wavelength of the emitted light,
Am1 is a parameter expressed as $p1^2$, where p1 is a pixel pitch of the first two-dimensional image sensor, included in the first measurement condition, and
erf is a standard error function, the numerical formula (3) being expressed as:

[Math. 2]

$$M2 = \left[ \sqrt{\frac{Ac2}{Am2}} \, \text{erf}\left(\sqrt{\frac{\pi \, Am2}{Ac2}}\right) - \left(\frac{Ac2}{\pi \, Am2}\right)\left\{1 - \exp\left(-\frac{\pi \, Am2}{Ac2}\right)\right\} \right]^{-2} \quad (3)$$

where Ac2 is a parameter expressed as $(((4/\pi) \times F2 \times \lambda)/2)^2 \times \pi$, where $\lambda$ is the wavelength of the emitted light, and
Am2 is a parameter expressed as $p2^2$, where p2 is a pixel pitch of the second two-dimensional image sensor, included in the second measurement condition.

3. The sparkle contrast correcting method according to claim 1, wherein the step of correcting the second sparkle contrast is performed in accordance with a numerical formula (4) expressed as:

$$S_p2a = S_p2 \times (F2/F1) \times (m1/m2) \times (M2/M1)^{0.5}, \quad (4)$$

where $S_p2a$ is the second sparkle contrast that is corrected,
$S_p2$ is the second sparkle contrast that is not corrected,
F1 is an image effective F-number of the first imaging lens, included in the first measurement condition,
F2 is an image effective F-number of the second imaging lens, included in the second measurement condition,
m1 is an optical magnification of the first imaging lens, included in the first measurement condition,
m2 is an optical magnification of the second imaging lens, included in the second measurement condition,
M1 is a value that is calculated by using a numerical formula (2), and
M2 is a value that is calculated by using a numerical formula (3), the numerical formula (2) being expressed as:

[Math. 3]

$$M1 = \left[ \sqrt{\frac{Ac1}{Am1}} \, \text{erf}\left(\sqrt{\frac{\pi \, Am1}{Ac1}}\right) - \left(\frac{Ac1}{\pi \, Am1}\right)\left\{1 - \exp\left(-\frac{\pi \, Am1}{Ac1}\right)\right\} \right]^{-2} \quad (2)$$

where Ac1 is a parameter expressed as $(((4/\pi) \times F1 \times \lambda)/2)^2 \times \pi$, where $\lambda$ is a wavelength of the emitted light,
Am1 is a parameter expressed as $p1^2$, where p1 is a pixel pitch of the first two-dimensional image sensor, included in the first measurement condition, and
erf is a standard error function, the numerical formula (3) being expressed as:

[Math. 4]

$$M2 = \left[\sqrt{\frac{Ac2}{Am2}} \text{erf}\left(\sqrt{\frac{\pi \, Am2}{Ac2}}\right) - \left(\frac{Ac2}{\pi \, Am2}\right)\left\{1 - \exp\left(-\frac{\pi \, Am2}{Ac2}\right)\right\}\right]^{-2} \quad (3)$$

where Ac2 is a parameter expressed as $(4/\pi) \times F2 \times \lambda)/2)^2 \times \pi$, where $\lambda$ is the wavelength of the emitted light, and Am2 is a parameter expressed as $p2^2$, where p2 is a pixel pitch of the second two-dimensional image sensor, included in the second measurement condition.

4. The sparkle contrast correcting method according to claim 1, wherein the step of correcting the second sparkle contrast is performed in accordance with a numerical formula (5) expressed as:

$$S_p 2a = S_p 2 \times (F2'/F1') \times (M2/M1)^{0.5}, \quad (5)$$

where $S_p 2a$ is the second sparkle contrast that is corrected, $S_p 2$ is the second sparkle contrast that is not corrected, F1' is an object effective F-number of the first imaging lens, included in the first measurement condition, F2' is an object effective F-number of the second imaging lens, included in the second measurement condition, M1 is a value that is calculated by using a numerical formula (2), and M2 is a value that is calculated by using a numerical formula (3), the numerical formula (2) being expressed as:

[Math. 5]

$$M1 = \left[\sqrt{\frac{Ac1}{Am1}} \text{erf}\left(\sqrt{\frac{\pi \, Am1}{Ac1}}\right) - \left(\frac{Ac1}{\pi \, Am1}\right)\left\{1 - \exp\left(-\frac{\pi \, Am1}{Ac1}\right)\right\}\right]^{-2} \quad (2)$$

Where Ac1 is a parameter expressed as $(((4/\pi) \times F1 \times \lambda)/2)^2 \times \pi$, where $\lambda$ is a wavelength of the emitted light, Am1 is a parameter expressed as $p1^2$, where p1 is a pixel pitch of the first two-dimensional image sensor, included in the first measurement condition, and erf is a standard error function, the numerical formula (3) being expressed as:

[Math. 6]

$$M2 = \left[\sqrt{\frac{Ac2}{Am2}} \text{erf}\left(\sqrt{\frac{\pi \, Am2}{Ac2}}\right) - \left(\frac{Ac2}{\pi \, Am2}\right)\left\{1 - \exp\left(-\frac{\pi \, Am2}{Ac2}\right)\right\}\right]^{-2} \quad (3)$$

Where Ac2 is a parameter expressed as $(4/\pi) \times F2 \times \lambda)/2)^2 \times \pi$, where $\lambda$ is the wavelength of the emitted light, and Am2 is a parameter expressed as $p2^2$, where p2 is a pixel pitch of the second two-dimensional image sensor, included in the second measurement condition.

5. The sparkle contrast correcting method according to claim 1, wherein, between the first measurement condition and the second measurement condition or between the imaginary measurement condition and the actual measurement condition, structural conditions of the electronic display, the anti-glare layer, and measurement devices that include the imaging lenses and the two-dimensional image sensors are the same, and measurement conditions including distances from the anti-glare layer to the imaging lenses with the measurement devices differ.

6. The sparkle contrast correcting method according to claim 1, wherein, between the first measurement condition and the second measurement condition or between the imaginary measurement condition and the actual measurement condition, structural conditions of the electronic display and the anti-glare layer are the same, structural conditions of measurement devices that include the imaging lenses and the two-dimensional image sensors differ, and measurement conditions including distances from the anti-glare layer to the imaging lenses with the measurement devices differ.

7. The sparkle contrast correcting method according to claim 1, wherein, between the first measurement condition and the second measurement condition or between the imaginary measurement condition and the actual measurement condition, structural conditions of the electronic display and measurement devices that include the imaging lenses and the two-dimensional image sensors are the same, structural conditions of the anti-glare layer differ, and measurement conditions including distances from the anti-glare layer to the imaging lenses with the measurement devices differ.

8. A sparkle contrast comparing method comprising: a step of comparing the sparkle contrast that is used as the comparison target and that is corrected by using the sparkle contrast correcting method according to claim 1 with the sparkle contrast that is used as the comparison standard.

9. The sparkle contrast comparing method according to claim 8, further comprising: a step of outputting a result of comparison between the sparkle contrast that is used as the comparison target and that is corrected and the sparkle contrast that is used as the comparison standard.

10. An electronic display manufacturing method comprising: a step of inspecting whether an electronic display to be inspected meets an acceptance standard of sparkle contrast,
    wherein the inspecting step includes the comparing step according to claim 8, and
    wherein the comparing step is a step of using a sparkle contrast of the electronic display to be inspected as the sparkle contrast that is used as the comparison target or the sparkle contrast that is used as the comparison standard, using a sparkle contrast meeting the acceptance standard as the other of the sparkle contrast that is used as the comparison target or the sparkle contrast that is used as the comparison standard, and comparing the sparkle contrast of the electronic display to be inspected with the sparkle contrast meeting the acceptance standard.

11. The electronic display manufacturing method according to claim 10, wherein no anti-glare layer is disposed on a surface of the electronic display to be inspected, and an anti-glare layer for inspection is disposed on the surface to measure the sparkle contrast at the inspecting step, and
    wherein the anti-glare layer for inspection has a predetermined characteristic.

12. The electronic display manufacturing method according to claim 10, wherein an anti-glare layer is disposed on a surface of the electronic display to be inspected.

13. An anti-glare layer manufacturing method comprising:
    a step of forming an anti-glare layer to be inspected; and
    a step of inspecting whether the anti-glare layer to be inspected meets an acceptance standard of sparkle contrast,
    wherein the inspecting step includes the comparing step according to claim 8, and wherein the comparing step is a step of using a sparkle contrast of an electronic display with the anti-glare layer to be inspected being disposed on a surface as the sparkle contrast that is used as the comparison target or the sparkle contrast that is used as the comparison standard, using a sparkle contrast meeting the acceptance standard as the other of the sparkle contrast that is used as the comparison target or the sparkle contrast that is used as the comparison standard, and comparing the sparkle contrast meeting the acceptance standard with the sparkle contrast of the electronic display with the anti-glare layer to be inspected being disposed on the surface.

14. The anti-glare layer manufacturing method according to claim 13, wherein the anti-glare layer to be inspected is disposed on a surface of an electronic display for inspection to measure the sparkle contrast at the inspecting step, and
wherein the electronic display for inspection has a predetermined characteristic.

15. The anti-glare layer manufacturing method according to claim 13,
wherein the step of forming the anti-glare layer to be inspected includes
a step of forming a layer that has an antiglare function on a base material.

16. The anti-glare layer manufacturing method according to claim 15,
wherein the step of forming the layer that has the antiglare function on the base material includes
a step of applying an anti-glare layer composition that contains resin to the base material, and
a step of curing the applied anti-glare layer composition.

17. An anti-glare layer that is manufactured by using the anti-glare layer manufacturing method according to claim 13.

18. An anti-glare layer selecting method comprising:
a step of selecting an anti-glare layer by using the sparkle contrast comparing method according to claim 8,
wherein the step of selecting the anti-glare layer includes
a step of using a first measurement contrast acquired by measuring a sparkle contrast of an electronic display with a first anti-glare layer being disposed on a surface by using a first optical measurement device as the sparkle contrast that is used as the comparison standard, using a second measurement contrast acquired by measuring a sparkle contrast of the electronic display with a second anti-glare layer that differs from the first anti-glare layer being disposed on the surface by using a second optical measurement device that differs from the first optical measurement device as the sparkle contrast that is used as the comparison target, and comparing the first measurement contrast and the second measurement contrast by using the comparing method along with correction of one of the contrasts, and
a step of selecting the first anti-glare layer or the second anti-glare layer, based on a result of the comparison.

19. The anti-glare layer selecting method according to claim 18,
wherein the step of selecting the first anti-glare layer or the second anti-glare layer includes a step of selecting an anti-glare layer having a good measurement contrast from the first anti-glare layer and the second anti-glare layer.

20. An anti-glare layer that is selected by using the anti-glare layer selecting method according to claim 18.

21. A polarizer that includes the anti-glare layer that is selected by using the anti-glare layer selecting method according to claim 18.

22. A display element that includes the anti-glare layer that is selected by using the anti-glare layer selecting method according to claim 18.

23. An electronic display that includes the anti-glare layer that is selected by using the anti-glare layer selecting method according to claim 18.

24. A display element selecting method comprising:
a step of selecting a display element by using the sparkle contrast comparing method according to claim 8;
wherein the step of selecting the display element includes
a step of using a third measurement contrast that is measured with a third anti-glare layer being disposed on a surface of a first display element by using a third optical measurement device as the sparkle contrast that is used as the comparison standard, using a fourth measurement contrast that is measured with the third anti-glare layer being disposed on a surface of a second display element that differs from the first display element by using a fourth optical measurement device that differs from the third optical measurement device as the sparkle contrast that is used as the comparison target, and comparing the third measurement contrast and the fourth measurement contrast by using the comparing method along with correction of one of the contrasts, and
a step of selecting the first display element or the second display element, based on a result of the comparison.

25. The display element selecting method according to claim 24,
wherein the step of selecting the first display element or the second display element includes a step of selecting a display element having a good measurement contrast from the first display element and the second display element.

26. An electronic display that includes the display element that is selected by using the display element selecting method according to claim 24.

27. A sparkle contrast comparing apparatus comprising:
a corrector that corrects the sparkle contrast that is used as the comparison target by using the sparkle contrast correcting method according to claim 1; and
a comparator that compares the sparkle contrast that is used as the comparison target and that is corrected and the sparkle contrast that is used as the comparison standard.

28. A sparkle contrast correcting method comprising: a step of acquiring a first sparkle contrast that is caused by an anti-glare layer that is disposed on a surface of an electronic display and information that represents a first measurement condition, the first sparkle contrast being used as a comparison standard and being measured in the first measurement condition by using a first imaging lens that images emitted light from the anti-glare layer and a first two-dimensional image sensor on which the emitted light is imaged;
a step of acquiring a second sparkle contrast that is caused by the anti-glare layer and information that represents a second measurement condition, the second sparkle contrast being used as a comparison target and being measured in the second measurement condition that differs from the first measurement condition by using a second imaging lens that images emitted light from the anti-glare layer and a second two-dimensional image sensor on which the emitted light is imaged; and a step of correcting the second sparkle contrast for comparison with the first sparkle contrast, wherein the step of correcting the second sparkle contrast includes a step of making a correction calculation on an image of the emitted light that is imaged in the second measurement condition such that a MTF that is calculated based on the image matches a MTF based on an image of the emitted light that is imaged in the first measurement condition in a case where the first measurement condition and the second measurement condition satisfy a numerical formula (6), and a step of acquiring the second sparkle contrast that is corrected from an image that is acquired by making the correction calculation, the numerical formula (6) being expressed as:

$$S1=S2, \quad (6)$$

where S1 is a size of a light-emitting region on the anti-glare layer contributory to imaging a diffraction limit spot of the emitted light on the first two-dimensional image sensor, included in the first measurement condition, and satisfies a numerical formula (7), and S2 is a size of a light-emitting region on the anti-glare layer contributory to imaging a diffraction limit spot of the emitted light on the second two-dimensional image sensor, included in the second measurement condition, and satisfies a numerical formula (8), the numerical formula (7) being expressed as:

[Math. 7]

$$S1 = \frac{R1}{m1} \propto \frac{F1}{m1} = F1\frac{d1}{f1} = F1' \quad (7)$$

where R1 is a size of the diffraction limit spot on the first two-dimensional image sensor, m1 is an optical magnification of the first imaging lens, included in the first measurement condition, F1 is an image effective F-number of the first imaging lens, included in the first measurement condition, d1 is a distance from the anti-glare layer to the first imaging lens, included in the first measurement condition, f1 is an effective focal length of the first imaging lens, included in the first measurement condition, and F1' is an object effective F-number of the first imaging lens, included in the first measurement condition, the numerical formula (8) being expressed as:

[Math. 8]

$$S2 = \frac{R2}{m2} \propto \frac{F2}{m2} = F2\frac{d2}{f2} = F2' \quad (8)$$

R2 is a size of the diffraction limit spot on the second two-dimensional image sensor, m2 is an optical magnification of the second imaging lens, included in the second measurement condition, F2 is an image effective F-number of the second imaging lens, included in the second measurement condition, d2 is a distance from the anti-glare layer to the second imaging lens, included in the second measurement condition, f2 is an effective focal length of the second imaging lens, included in the second measurement condition, and F2' is an object effective F-number of the second imaging lens, included in the second measurement condition.

29. The sparkle contrast correcting method according to claim 28, wherein the step of making the correction calculation includes a step of adjusting a coefficient of an enhancement filter that adjusts resolution of the image of the emitted light that is imaged in the second measurement condition.

30. The sparkle contrast correcting method according to claim 29, wherein the step of making the correction calculation further includes a step of generating an edge profile of the image of the emitted light that is imaged in the second measurement condition, a step of calculating a line spread function by differentiating the generated edge profile, a step of calculating a MTF by applying Fourier transform to the calculated line spread function, and a step of comparing the calculated MTF with the MTF based on the image of the emitted light that is imaged in the first measurement condition.

31. The sparkle contrast correcting method according to claim 28, wherein the step of correcting the second sparkle contrast includes a step of matching an average value of radiance of the image that is acquired by making the correction calculation to an average value of radiance of the image of the emitted light that is imaged in the first measurement condition between the step of making the correction calculation on the image of the emitted light that is imaged in the second measurement condition and the step of acquiring the second sparkle contrast that is corrected from the image that is acquired by making the correction calculation.

32. The sparkle contrast correcting method according to claim 31, wherein the step of correcting the second sparkle contrast includes a step of removing an image component that is generated due to a pixel of the electronic display from the image that is acquired by making the correction calculation between the step of making the correction calculation on the image of the emitted light that is imaged in the second measurement condition and the step of matching the average value of radiance of the image that is acquired by making the correction calculation to the average value of radiance of the image of the emitted light that is imaged in the first measurement condition.

33. A sparkle contrast correcting method comprising: a step of acquiring a third sparkle contrast that is caused by an anti-glare layer that is disposed on a surface of an electronic display and information that represents an imaginary measurement condition, the third sparkle contrast being used as a comparison standard and being imaginarily measured in the imaginary measurement condition by using an imaginary imaging lens that images emitted light from the anti-glare layer and an imaginary two-dimensional image sensor on which the emitted light is imaged;

a step of acquiring a fourth sparkle contrast that is caused by the anti-glare layer and information that represents an actual measurement condition, the fourth sparkle contrast being used as a comparison target and being actually measured in the actual measurement condition by using an actual imaging lens that images emitted light from the anti-glare layer and an actual two-dimensional image sensor on which the emitted light is imaged; and a step of correcting the fourth sparkle contrast for comparison with the third sparkle contrast, wherein the step of correcting the fourth sparkle contrast includes a step of correcting the fourth sparkle contrast in accordance with a numerical formula (10) in a case where the imaginary measurement condition and the actual measurement condition satisfy a numerical formula (9) expressed as:

$$S3 \neq S4, \quad (9)$$

the numerical formula (10) being expressed as:

$$S_P4a = S_P4 \times (S4/S3), \quad (10)$$

where S3 is a size of a light-emitting region on the anti-glare layer contributory to imaging a diffraction limit spot of the emitted light from the anti-glare layer on the two-dimensional image sensor, included in the imaginary measurement condition, and satisfies a numerical formula (11), S4 is a size of a light-emitting region on the anti-glare layer contributory to imaging a diffraction limit spot of the emitted light from the anti-glare layer on the two-dimensional image sensor, included in the actual measurement condition, and satisfies a numerical formula (12), $S_P4a$ is the fourth sparkle contrast that is corrected, and $S_P4$ is the fourth sparkle contrast that is not corrected, the numerical formula (11) being expressed as:

[Math. 9]

$$S3 = \frac{R3}{m3} \propto \frac{F3}{m3} = F3\frac{d3}{f3} = F3' \quad (9)$$

where R3 is a size of the diffraction limit spot on the two-dimensional image sensor, m3 is an optical magnification of the imaging lens, included in the imaginary measurement condition, F3 is an image effective F-number of the imaging lens, included in the imaginary measurement condition, d3 is a distance from the anti-glare layer to the imaging lens, included in the imaginary measurement condition, f3 is an effective focal length of the imaging lens, included in the imaginary measurement condition, and F3' is an object effective F-number of the imaging lens, included in the imaginary measurement condition, the numerical formula (12) being expressed as:

[Math. 10]

$$S4 = \frac{R4}{m4} \propto \frac{F4}{m4} = F4\frac{d4}{f4} = F4' \quad (12)$$

where R4 is a size of the diffraction limit spot on the two-dimensional image sensor, m4 is an optical magnification of the imaging lens, included in the actual measurement condition, F4 is an image effective F-number of the imaging lens, included in the actual measurement condition, d4 is a distance from the anti-glare layer to the imaging lens, included in the actual measurement condition, f4 is an effective focal length of the imaging lens, included in the actual measurement condition, and F4' is an object effective F-number of the imaging lens, included in the actual measurement condition.

34. The sparkle contrast correcting method according to claim 33, wherein the step of correcting the fourth sparkle contrast further includes a step of correcting the fourth sparkle contrast in accordance with a numerical formula (13) expressed as:

$$S_P4a' = S_P4a \times (M4/M3)^{0.5}, \quad (13)$$

where $S_P4a'$ is the fourth sparkle contrast that is corrected in accordance with the numerical formula (13), M3 is a value that is calculated by using a numerical formula (14), and M4 is a value that is calculated by using a numerical formula (15), the numerical formula (14) being expressed as:

[Math. 11]

$$M3 = \left[\sqrt{\frac{Ac3}{Am3}} \operatorname{erf}\left(\sqrt{\frac{\pi\, Am3}{Ac3}}\right) - \left(\frac{Ac3}{\pi\, Am3}\right)\left\{1 - \exp\left(-\frac{\pi\, Am3}{Ac3}\right)\right\}\right]^{-2} \quad (14)$$

where Ac3 is a parameter expressed as $(((4/\pi) \times F3 \times \lambda)/2)^2 \times \pi$, where $\lambda$ is a wavelength of the emitted light, Am3 is a parameter expressed as $p3^2$, where p3 is a pixel pitch of the two-dimensional image sensor, included in the imaginary measurement condition, and erf is a standard error function, the numerical formula (15) being expressed as:

[Math. 12]

$$M4 = \left[\sqrt{\frac{Ac4}{Am4}} \operatorname{erf}\left(\sqrt{\frac{\pi\, Am4}{Ac4}}\right) - \left(\frac{Ac4}{\pi\, Am4}\right)\left\{1 - \exp\left(-\frac{\pi\, Am4}{Ac4}\right)\right\}\right]^{-2} \quad (15)$$

where Ac4 is a parameter expressed as $(((4/\pi) \times F4 \times \lambda)/2)^2 \times \pi$, where $\lambda$ is the wavelength of the emitted light, and Am4 is a parameter expressed as $p4^2$, where p4 is a pixel pitch of the two-dimensional image sensor, included in the imaginary measurement condition.

* * * * *